(12) United States Patent
Hendi et al.

(10) Patent No.: US 6,626,990 B2
(45) Date of Patent: Sep. 30, 2003

(54) USE OF AROMATIC COMPOUNDS AS PHASE DIRECTORS AND PARTICLE SIZE REDUCERS FOR QUINACRIDONE PIGMENTS

(75) Inventors: Shivakumar Basalingappa Hendi, Newark, DE (US); Suruliappa Gowder Jeganathan, Glenmills, PA (US); James Barry Ganci, Wilmington, DE (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/100,600

(22) Filed: Mar. 18, 2002

(65) Prior Publication Data

US 2002/0161232 A1 Oct. 31, 2002

Related U.S. Application Data

(60) Provisional application No. 60/277,824, filed on Mar. 22, 2001.

(51) Int. Cl.[7] .................. C09B 48/00; C07D 471/02; C07D 251/12
(52) U.S. Cl. .................. 106/497; 546/49; 546/56; 546/57; 544/180; 106/499
(58) Field of Search ............... 546/49, 56, 57; 106/497, 499; 544/180

(56) References Cited

U.S. PATENT DOCUMENTS

| | | | |
|---|---|---|---|
| 2,402,167 A | 6/1946 | Lang et al. | 260/314.5 |
| 3,030,370 A | 4/1962 | Jackson | 260/279 |
| 3,257,405 A | 6/1966 | Gerson et al. | 260/279 |
| 3,326,918 A | 6/1967 | West | 260/279 |
| 3,386,843 A | 6/1968 | Jaffe et al | 106/288 |
| 3,607,336 A | 9/1971 | Jaffe | 106/288 |
| 3,843,371 A | 10/1974 | Piller et al. | 96/84 |
| 4,197,404 A | 4/1980 | Johnson | 546/49 |
| 4,310,359 A | 1/1982 | Ehashi et al. | 106/288 |
| 4,455,173 A | 6/1984 | Jaffe | 106/288 |
| 4,541,872 A | 9/1985 | Jaffe | 106/309 |
| 4,619,956 A | 10/1986 | Susi | 524/87 |
| 4,740,542 A | 4/1988 | Susi | 524/87 |
| 5,084,100 A | 1/1992 | Bauman | 106/495 |
| 5,096,489 A | 3/1992 | Laver | 106/20 |
| 5,106,891 A | 4/1992 | Valet | 524/91 |
| 5,112,404 A | 5/1992 | Sommer et al. | 106/506 |
| 5,281,269 A | 1/1994 | Ganci et al. | 106/497 |
| 5,354,794 A | 10/1994 | Stevenson et al. | 524/100 |
| 5,368,641 A | 11/1994 | Dietz et al. | 106/495 |
| 5,424,429 A | 6/1995 | Hendi et al. | 546/49 |
| 5,457,203 A | 10/1995 | Hendi et al. | 546/56 |
| 5,472,494 A | 12/1995 | Hetzenegger et al. | 106/493 |
| 5,556,973 A | 9/1996 | Stevenson et al. | 544/216 |
| 5,681,955 A | 10/1997 | Stevenson | 544/216 |
| 5,726,309 A | 3/1998 | Stevenson et al. | 544/216 |
| 5,755,873 A | 5/1998 | Badejo et al. | 106/497 |
| 5,840,901 A | 11/1998 | Bäbler | 546/49 |
| 5,856,488 A | 1/1999 | Bäbler | 546/49 |
| 6,013,127 A | 1/2000 | Bäbler | 106/497 |
| 6,013,704 A | 1/2000 | Hayoz et al. | 524/100 |
| 6,060,543 A | 5/2000 | Bolle et al. | 524/100 |
| 6,255,483 B1 | 7/2001 | Fletcher et al. | 544/216 |

FOREIGN PATENT DOCUMENTS

| | | |
|---|---|---|
| DE | 1210110 | 2/1966 |
| EP | 0434608 | 6/1991 |
| EP | 0941989 | 9/1999 |
| EP | 1026207 | 8/2000 |
| GB | 2317714 | 4/1998 |
| WO | 96/28431 | 9/1996 |

OTHER PUBLICATIONS

H. Brunetti and C.E. Luthi, Helv. Chim. Acta vol. 55, (1972) pp. 1566–1595.

*Primary Examiner*—Charanjit S. Aulakh
(74) *Attorney, Agent, or Firm*—David R. Crichton

(57) ABSTRACT

The present invention relates to a process for producing alpha, gamma-I, gamma-II and gamma-III crystal modifications of quinacridone and transparent quinacridone pigments including the solid solutions of various quinacridones, using a variety of tris-aryl-s-triazines, particularly resorcinol triazine derivatives, or aromatic- or heteroaromatic-compounds having at least one hydroxyl or keto group bonded to the ring, as an additive, prior to or concurrently with the oxidation of corresponding dihydroquinacridone salts.

11 Claims, 9 Drawing Sheets

USE OF AROMATIC COMPOUNDS AS PHASE DIRECTORS AND PARTICLE SIZE REDUCERS FOR QUINACRIDONE PIGMENTS

This application claims the benefit under 35 U.S.C. 119(e) of U.S. Provisional Application No. 60/277,824, Filed Mar. 22, 2001. This invention relates to a process for producing alpha, gamma-I, gamma-II and gamma-III crystal modifications of quinacridone and transparent quinacridone pigments including the solid solutions of various quinacridones, using a variety of tris-aryl-s-triazines, particularly resorcinol triazine derivatives, or aromatic- or heteraromatic-compounds having at least one hydroxyl or keto group bonded to the ring, as an additive, during the synthesis of pigmentary quinacridones.

The hydrogen peroxide oxidation of dihydroquinacridones, as described in U.S. Pat. No. 5,840,901, is a new environmentally friendly method for preparing quinacridone pigments. This process, like other oxidation methods, has one drawback in that it produces mostly large particle size crude products. Any improvement of this method to produce small particle size pigments would be highly desirable as this would eliminate the need for costly and undesirable finishing processes such as dry milling (U.S. Pat. Nos. 2,402,167 and 3,030,370) and acid drowning (U.S. Pat. Nos. 3,326,918 and 3,607,336).

It is well known that the unsubstituted quinacridone, depending on the experimental conditions, forms different crystal phases such as alpha, beta and gamma including the gamma-I, gamma-II and gamma-III polytypes. The currently commercial and important quinacridones are beta, gamma-I and gamma-II crystal forms. The gamma-I and the gamma-III crystal phase quinacridone can be produced by either recrystallizing in a particular solvent or by a dry milling process.

The use of derivatized pigments as additives in pigmentary quinacridone preparation is well known. Some of the already known quinacridone derivatives are e.g. pyrazolylmethyl quinacridone; phthalimidomethyl quinacridone; quinacridone sulfonic acids; various salts of the quinacridone sulfonic acids and many others. Some of these quinacridone derivatives have been used as pigment particle growth modifiers and some others are used for rheology improvement. The known methods for the preparation of pigmentary quinacridones are for instance the milling of large particle size crude quinacridones in the presence of large amounts of an inorganic salt which must be removed afterwards as described in U.S. Pat. No. 5,084,100. Pigmentary quinacridones can be obtained by a tandem premilling-solvent ripening method as described in U.S. Pat. Nos. 5,281,269 and 4,541,872.

The above mentioned additives for instance have been used during the pigment preparation by the milling, solvent treatment, or post-solvent treatment steps to further improve pigment properties. For example, U.S. Pat. No. 5,084,100 discloses a method in which crude quinacridone is ball milled in the presence of aluminum sulfate and the dibasic esters of various carboxylic acids. Other ways of making pigmentary quinacridones are described in U.S. Pat. No. 4,455,173 wherein the crude quinacridone pigments are acid pasted or ball milled and then milled in an organic liquid, preferably in the presence of a 2-phthalimidomethylquinacridone particle-size growth inhibitor. Various pigment derivatives for treating pigments, including quinacridone pigments, have also been described in U.S. Pat. Nos. 3,386,843; 4,310,359, and 5,472,494.

The addition of certain quinacridone derivatives in the preparation of quinacridones by the polyphosphoric acid ring-closure route has been reported in U.S. Pat. Nos. 5,368,641 and 5,755,873 which disclose the preparation of pigmentary quinacridones, particularly the pigmentary 2,9-dimethylquinacridone. The use of such pigment derivatives in the preparation of pigmentary quinacridones by the oxidation of dihydro quinacridones has been reported in U.S. Pat. Nos. 5,424,429, 5,457,203 and 5,840,901.

The preparation and uses of the triazine UV absorbers have been described in patent literature. These additives are used for automotive coatings, photographic application, polymeric film coatings and ink jet printing. Automotive coatings are described in British 2,317,174A and 2,317,893A and in U.S. Pat. Nos. 5,354,794; 5,556,973; 5,681,955; 5,726,309 and 5,106,891. Photographic applications are disclosed in U.S. Pat. No. 3,843,371. Polymeric film coatings are described in U.S. Pat. Nos. 4,619,956 and 4,740,542. Ink jet printing is disclosed in U.S. Pat. No. 5,096,489. Tris-aryl-s-triazines are commonly understood to refer to tri-aryl compounds in which at least one of the aryl groups has a hydroxy group ortho to the point of attachment to a triazine ring. Resorcinol derivatives, for purposes of this application, are compounds substituted in the 2,4-positions by hydroxyl groups on at least one phenyl ring of a tris-aryl-s-triazine compound. U.S. Pat. No. 5,726,309 describes resorcinol numbering and is incorporated herein in its entirety by reference.

Accordingly, it was the object of the present invention to provide a process for producing alpha, gamma-I, gamma-II and gamma-III crystal modifications of quinacridone and transparent quinacridone pigments including the solid solutions of various quinacridones.

Said object has surprisingly been solved by a process for producing a quinacridone pigment according to formula B

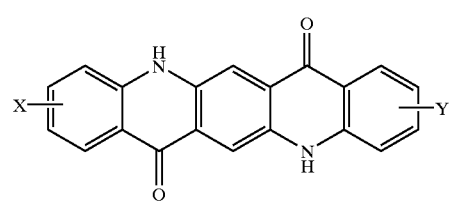

B or a solid solution thereof, comprising oxidizing a salt of a corresponding 6,13-dihydroquinacridone of formula A or a mixture of two or more 6,13-dihydroquinacridones of formula A

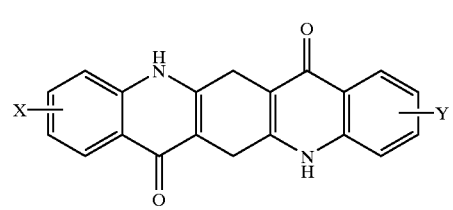

A in which X and Y are independently 1 or 2 substituents selected from the group consisting of H, F, Cl, $C_1$–$C_4$ alkyl and $C_1$–$C_4$ alkoxy, in the presence of at least one (hetero) aromatic hydroxyl or keto group containing compound that does not contain a pigment moiety and an oxidizing agent.

That is, this invention relates to a process for obtaining alpha, gamma-I, gamma-II and gamma-III quinacridones and other transparent quinacridones and their solid solutions involving various compositions of structure B, using the hydroxyl or keto group containing aromatic and heteroaromatic compounds, for instance, resorcinol triazine compounds, as additives in the oxidation, for example the hydrogen peroxide oxidation of dihydroquinacridones. The additives are used at 1–25% by weight relative to the weight of dihydroquinacridones, preferably at 1–10%.

Figure 1:
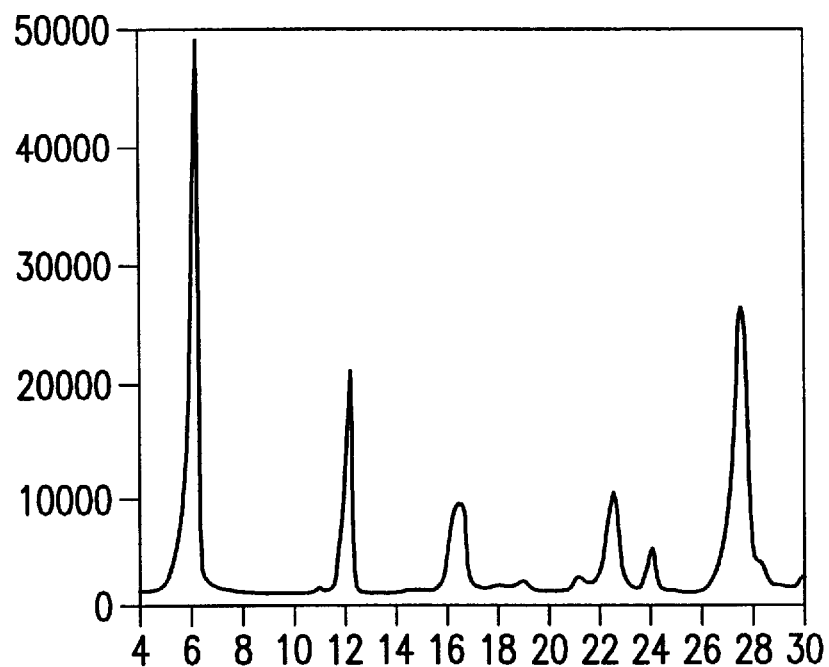
FIG. 1 is an X-ray diffraction pattern for the product of example 1.

The dihydroquinacridones and quinacridones to which the invention is applicable are compounds of formulae A and B respectively,

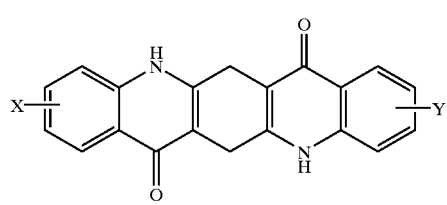

A

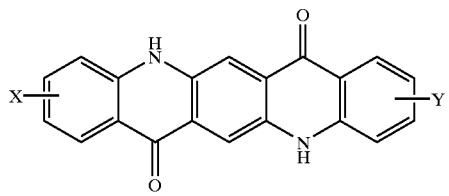

B in which X and Y are independently 1 or 2 substituents selected from the group consisting of H, F, Cl, $C_1$–$C_4$alkyl and $C_1$–$C_4$alkoxy.

$C_1$–$C_4$alkyl stands for methyl, ethyl, n- and i-propyl, n-butyl, sec.-butyl, i-butyl and tert.-butyl, preferably methyl. $C_1$–$C_4$alkoxy stands for methoxy, ethoxy, n- and i-propoxy, n-butoxy, sec.-butoxy, i-butoxy and tert.-butoxy, preferably methoxy.

Preferably, the positions 2 and 9 of the quinacridones of the formula A and B are substituted.

The instant process is especially useful for the preparation of unsubstituted quinacridone, 2,9-dichloroquinacridone, 2,9-difluoroquinacridone, 4,11-dichloroquinacridone, 2,9-dimethylquinacridone and 2,9-dimethoxyquinacridone or for the preparation of quinacridone/2,9-dichloroquinacridone, quinacridone/4,11-dichloroquinacridone, quinacridone/2,9-dimethylquinacridone, quinacridone/2,9-dimethoxyquinacridone, 2,9-dichloroquinacridone/2,9-dimethylquinacridone, 2,9-dichloroquinacridone/2,9-dimethoxyquinacridone or 2,9-dimethylquinacridone/2,9-dimethoxyquinacridone solid solution pigments.

The present invention relates to a process for preparing a quinacridone of the formula B or a solid solution thereof by the oxidation of a salt of the corresponding 6,13-dihydroquinacridone of the formula A or a mixture of two or more 6,13-dihydroquinacridones of formula A, which comprises an oxidation step wherein the 6,13-dihydroquinacridone salt is oxidized in the presence of selected aromatic additives.

The selected aromatic compounds are added before or during the oxidation of a dihydroquinacridone to a corresponding quinacridone. Examples of preferred aromatic additives are UV absorbers based on 4,6-bis-(2,4-dimethylphenyl)-2-(2,4-dihydroxyphenyl)-s-triazine such as Tinuvin® 400, Ciba Specialty Chemicals Corp., and Cyasorb® 1164, Cytec Corporation, or red-shifted s-triazines as disclosed, for example, in U.S. Pat. Nos. 5,556,973 and 5,354,794, or high molar extinction s-triazines as disclosed in copending application Ser. No. 09/383,163 (U.S. Pat. No. 6,255,483).

One example of an oxidation process is described in U.S. Pat. No. 5,840,901, which is incorporated herein by reference. The 6,13-dihydroquinacridone salt is prepared, for example, by stirring the 6,13-dihydroquinacridone in a basic medium, for example a basic mixture of water and alcohol, at a temperature above 30° C., preferably 40 to 60° C., and most preferably between 50° C. and the corresponding reflux temperature, for 5 minutes to 2½ hours, preferably 20 minutes to 1½ hours.

The oxidation reaction is carried out in a reaction medium obtained by combining a slurry which consists essentially of a 6,13-dihydroquinacridone, the aromatic additive, the base and a suitable liquid phase, with an oxidizing agent. A suitable liquid phase is any liquid media which promotes the oxidation reaction, and which does not react to a significant extent with the oxidizing agent.

A common liquid phase is a mixture of a lower alcohol and water that contains 20 to 750 parts, preferably 40 to 600 parts of water, and 50 to 750 parts, preferably 100 to 600 parts, of alcohol per 100 parts 6,13-dihydroquinacridone; parts being parts by weight. The alcohol is advantageously a lower alcohol, for example, a $C_1$–$C_3$ alkanol, preferably methanol. The reaction medium is preferably substantially free of other organic solvents. However, organic solvents are tolerated in the reaction medium as long as they do not impair the 6,13-dihydroquinacridone salt generation or the oxidation reaction.

Any base capable of forming the salt of the 6,13-dihydroquinacridone is useful in the reaction medium. Preferably, the base is an alkali metal hydroxide, most preferably sodium or potassium hydroxide. In certain instances, it is advantageous to use a mixture of sodium hydroxide and potassium hydroxide. The molar ratio of the base to 6,13-dihydroquinacridone is typically from 1 to 7 moles of base per mole of the 6,13-dihydroquinacridone. Preferably, the reaction medium contains 2.2 to 5 moles of base per mole of the 6,13-dihydroquinacridone.

The generation of the 6,13-dihydroquinacridone salt is observable under the light microscope by the formation of crystals of the 6,13-dihydroquinacridone salt. Depending on the reaction conditions, the kind of base and/or the substituents on 6,13-dihydroquinacridone, the salt is generally in the form of needles, prisms, cubes or platelets.

The oxidation reaction is preferably carried out under an inert gas flow, for example a nitrogen flow.

In one oxidation process, the oxidation is carried out by combining an aqueous solution of hydrogen peroxide as the oxidizing agent with a slurry of the 6,13-dihydroquinacridone in a basic mixture of aqueous alcohol and base over a time interval of from 5 minutes to 6 hours, preferably over 30 minutes to 3½ hours, and subsequently maintaining the reaction medium at an elevated temperature with stirring for a period of time to complete the oxidation and promote pigment recrystallization. The reaction medium is advantageously maintained at a temperature of above 50° C., preferably at reflux temperature for from 5 minutes to 5 hours, preferably 30 minutes to 4 hours, after the addition of the hydrogen peroxide. The pigment is then isolated by filtration, washing with alcohol followed by hot water and drying. The base and the alcohol can be easily regenerated from the filtrate.

The aqueous solution of hydrogen peroxide generally contains from 1 to 50 weight-percent, preferably 5 to 30 weight-percent, and most preferably 10 to 25 weight-percent, of hydrogen peroxide. In general, a small excess of the hydrogen peroxide is used. The molar ratio of hydrogen peroxide to 6,13-dihydroquinacridone is, for example, 1.1 to 5 moles, preferably 1.2 to 3.5 moles, of hydrogen peroxide per mole of the 6,13-dihydroquinacridone.

The oxidation of the 6,13-dihydroquinacridone salt to the corresponding quinacridone by hydrogen peroxide is visually followed by the color change of the reaction mixture.

The presence of an oxidation-promoting amount of the catalyst during the oxidation step leads to a higher yield of quinacridone. Additionally, the presence of the catalyst under the oxidation conditions described above, results in a quinacridone product that is substantially free of quinacridonequinone, for example containing less than 2.5 percent by weight of quinacridonequinone. Minor amounts of quinacridonequinone are tolerated in the final product so long as its presence does not substantially reduce the saturation of the final quinacridone pigment.

Any compound capable of catalyzing the oxidation of 6,13-dihydroquinacridone under the present reaction conditions can be utilized as the catalyst. Particularly suitable catalysts used in the inventive process are, for example, the quinone compounds used for the air oxidation of 6,13-dihydroquinacridone to quinacridone. Such quinone catalysts are well-known in the art. In particular, suitable catalysts include anthraquinone compounds, especially anthraquinone, and anthraquinone sulfonic acid derivatives, such as anthraquinone-2,6-disulfonic acid or preferably anthraquinone-2-sulfonic acid, or salts thereof, in particular the sodium or potassium salts, especially anthraquinone-2-sulfonic acid, sodium or potassium salt. The quinone catalyst is present in the reaction medium in an amount effective to catalyze the oxidation reaction, for example from 0.005 to 0.1 times the weight of 6,13-dihydroquinacridone, and most preferably 0.01 to 0.05 times the weight of 6,13-dihydroquinacridone.

Depending on the composition of the liquid phase, the recrystallization time and temperature, transparent smaller particle size or opaque larger particle size quinacridone pigments are generated. Lower temperatures and shorter times favor a transparent product, while higher temperatures and longer times favor a more opaque product.

Different crystal forms of the quinacridone product are generated depending on the reaction conditions used, such as, for example, the kind and concentration of base and the composition of the liquid phase, and the kind and concentration of particle growth inhibitors which may be present during the oxidation step. Additionally, the crystal modification of the quinacridone product is controlled by adding from about 1 to 10 percent of seed crystals of quinacridone pigment having the desirable crystal modification. The seed crystals are added preferably prior to the oxidation, most preferably prior to salt formation.

The type of oxidation reaction is not limited to the hydrogen peroxide reaction described above. The dihydroquinacridone can alternatively be oxidized to a corresponding quinacridone using aromatic nitro compounds as the oxidizing agent in an alcoholic medium containing a base and a small amount of water. It is also known that a dihydroquinacridone can be converted to a corresponding quinacridone by a process wherein the 6,13-dihydroquinacridone is oxidized in a solvent and/or aqueous basic system with an oxygen-containing gas. Such processes are often referred to as "air oxidation" because air is conveniently used as the oxygen-containing gas. Furthermore, it is known that the oxidation of 6,13-dihydroquinacridones can be performed by dissolving in polar solvents, for example DMSO, using air as the oxidizing agent.

One class of aromatic additives are tris-aryl-s-triazines which are commonly understood to refer to tri-aryl compounds in which at least one of the aryl groups has a hydroxy group ortho to the point of attachment to a triazine ring; wherein resorcinol derivatives, for purposes of this application, are compounds substituted in the 2,4-positions by hydroxyl groups on at least one phenyl ring of a tris-aryl-s-triazine compound.

The tris-aryl-s-triazines are preferably represented by formula (I)

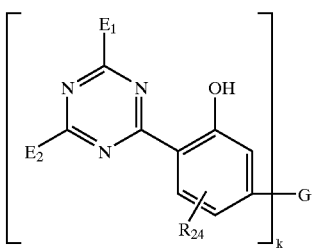

(I)

wherein
k is 1 or 2; and
when k=1, G is hydrogen or —OR$_{25}$
E$_1$ and E$_2$ independently of one another, are a group of the formula Ia or Ib

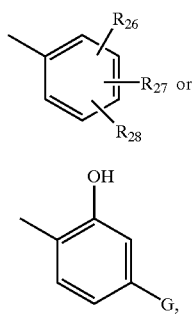

(Ia)

(Ib)

wherein
R$_{25}$ is hydrogen; C$_1$–C$_{18}$alkyl; C$_1$–C$_{18}$alkyl which is substituted by OH, halogen, —COOH, —COOR$_{29}$, —CONH$_2$, —CONHR$_{30}$, —CON(R$_{30}$)(R$_{31}$), —NH$_2$, NHR$_{30}$, —N(R$_{30}$)(R$_{31}$), —NHCOR$_{32}$, —CN, COR$_{32}$, —OCOR$_{32}$, phenoxy and/or C$_1$–C$_{18}$alkyl-, C$_1$–C$_{18}$alkoxy- or halo-substituted phenoxy; C$_3$–C$_{50}$ alkyl which is interrupted by —O— and can be substituted by OH; C$_3$–C$_6$alkenyl; glycidyl; C$_5$–C$_{12}$cycloalkyl; C$_5$–C$_{12}$cycloalkyl substituted by OH, C$_1$–C$_4$alkyl or —OCOR$_{32}$; C$_7$–C$_{11}$phenylalkyl which is unsubstituted or substituted by OH, Cl, C$_1$–C$_{18}$alkoxy or C$_1$–C$_{18}$ alkyl; —COR$_{32}$ or —SO$_2$—R$_{33}$; or
a radical of one of the formulae

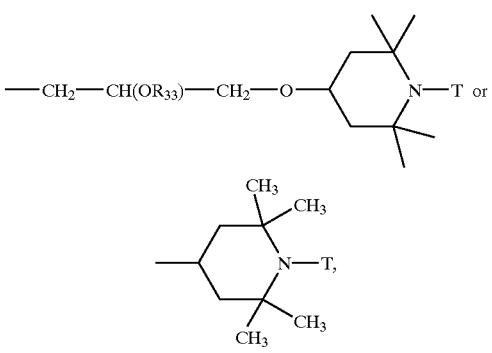

in which
T is hydrogen; C$_1$–C$_8$alkyl; C$_2$–C$_8$alkyl which is substituted by one or more hydroxyl groups or by one or more acyloxy groups; oxyl; hydroxyl; —CH$_2$CN; C$_1$–C$_{18}$alkoxy; C$_5$–C$_{12}$cycloalkoxy; C$_3$–C$_6$alkenyl; C$_7$–C$_9$phenylalkyl; C$_7$–C$_9$phenylalkyl which is substituted once, twice or three times in the phenyl ring by C$_1$–C$_4$alkyl; or is aliphatic C$_1$–C$_8$alkanoyl;
R$_{24}$ is hydrogen; C$_1$–C$_{24}$alkyl or C$_5$–C$_{12}$cycloalkyl; or is C$_1$–C$_{24}$alkyl or C$_5$–C$_{12}$cycloalkyl which is substituted by 1 to 9 halogen atoms, OH, OR$_{25}$, halogen, —COOH, —COOR$_{29}$, —CONH$_2$, —CONHR$_{30}$, —CON(R$_{30}$)(R$_{31}$), —NH$_2$, NHR$_{30}$, —N(R$_{30}$)(R$_{31}$), —NHCOR$_{32}$, —CN, COR$_{32}$, —CN, —NO$_2$, —SR$_{32}$, —SOR$_{32}$, —SO$_2$R$_{32}$, —P(O)(OR$_{25}$)$_2$,
a morpholinyl, piperidinyl, 2,2,6,6-tetramethylpiperidinyl, piperazinyl or N-methylpiperazinyl group or by combinations thereof; or is C$_5$–C$_{12}$cycloalkyl or C$_1$–C$_{24}$alkyl which is interrupted by 1 to 6 phenylene, —O—, —NR$_{29}$—, —CONR$_{29}$—, —COO—, —OCO—, —CH(R$_{33}$)—, —C(R$_{33}$)$_2$— or —CO— groups or combinations thereof; or R$_{24}$ is C$_2$–C$_{24}$alkenyl; halogen; —SR$_{32}$, SOR$_{32}$; SO$_2$R$_{32}$; —SO$_3$H; or SO$_3$M;
R$_{26}$, R$_{27}$ and R$_{28}$, independently of one another, are H, C$_1$–C$_{12}$alkyl; C$_2$–C$_6$alkenyl; C$_1$–C$_{18}$alkoxy; C$_5$–C$_{12}$cycloalkoxy; C$_2$–C$_{18}$alkenoxy; halogen; —C≡N; C$_1$–C$_4$haloalkyl; C$_1$–C$_{11}$phenylalkyl; or phenyloxy, CONH$_2$; —CONHR$_{30}$; —CON(R$_{30}$)(R$_{31}$); sulfo; C$_2$–C$_{18}$acylamino; OCOR$_{32}$; phenyloxy; or phenyloxy, which is substituted by C$_1$–C$_{18}$alkyl, C$_1$–C$_{18}$alkoxy or halogen;
R$_{29}$ is C$_1$–C$_{18}$alkyl; C$_3$–C$_{18}$alkenyl; C$_3$–C$_{50}$alkyl which is interrupted by O, NH, NR$_{30}$ or S and/or is substituted by OH; glycidyl; C$_5$–C$_{12}$cycloalkyl; C$_1$–C$_4$alkylcyclohexyl; phenyl; C$_7$–C$_{14}$alkylphenyl; C$_6$–C$_{15}$bicycloalkyl; C$_6$–C$_{15}$bicycloalkenyl; C$_6$–C$_{15}$tricycloalkyl; C$_6$–C$_{15}$bicycloalkylalkyl; or C$_7$–C$_{11}$phenylalkyl;
R$_{30}$ and R$_{31}$, independently of one another are C$_1$–C$_{12}$alkyl; C$_3$–C$_{12}$alkoxyalkyl; C$_2$–C$_{18}$alkanoyl; C$_4$–C$_{16}$dialkylaminoalkyl or C$_5$–C$_{12}$cycloalkyl; or R$_{30}$ and R$_{31}$ together are C$_3$–C$_9$alkylene or -oxaalkylene or -azaalkylene;
R$_{32}$ is C$_1$–C$_{18}$alkyl; C$_1$–C$_{12}$alkoxy; C$_2$–C$_{18}$alkenyl; C$_7$–C$_{11}$phenylalkyl; C$_7$–C$_{11}$phenylalkoxy; C$_6$–C$_{12}$cycloalkyl; C$_6$–C$_{12}$cycloalkoxy; phenoxy or phenyl; or is C$_3$–C$_{50}$alkyl which is interrupted by —O— and can be substituted by OH;
R$_{33}$ is C$_1$–C$_{18}$alkyl; C$_2$–C$_{18}$alkenyl; C$_6$–C$_{12}$cycloalkyl;
provided at least one G is an —OR$_{21}$ group;
when k=2,
E$_1$ and E$_2$ are a group of the formula Ia;
G is C$_2$–C$_{16}$alkylene, C$_4$–C$_{12}$alkenylene, xylylene, C$_3$–C$_{20}$alkylene which is interrupted by O and/or substituted by OH, or a group of the formula
—CH$_2$CH(OH)CH$_2$O—R$_{34}$—OCH$_2$CH(OH)CH$_2$—, —CO—R$_{35}$—CO—, —CO—NH—R$_{36}$—NH—CO—, —(CH$_2$)$_j$—COO—G$_{20}$—OOC—(CH$_2$)$_j$—, in which j is a number from the range from 1 to 3, or

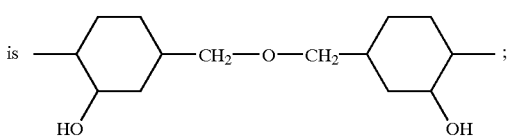

R$_{34}$ is C$_2$–C$_{10}$alkylene; C$_4$–C$_{50}$alkylene which is interrupted by O, phenylene, or a group -phenylene-E- phenylene-, in which E is —O—, —S—, —SO$_2$—, —CH$_2$—, —CO—, or —C(CH$_3$)$_2$—;

R$_{35}$ is C$_2$–C$_{10}$alkylene, C$_2$–C$_{10}$oxaalkylene, C$_2$–C$_{10}$thiaalkylene, C$_6$–C$_{12}$arylene or C$_2$–C$_6$alkenylene;

R$_{36}$ is C$_2$–C$_{10}$alkylene, phenylene, tolylene, diphenylenemethane or a group of the formula

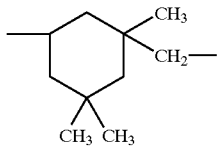

M is alkali metal.

Compounds of formula I are alternatively described in the context of the invention:

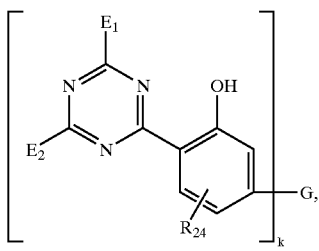

(I)

wherein

G is hydrogen or —OR$_{25}$, k is 1,

E$_1$ and E$_2$ independently of one another, are a group of the formula Ia or Ib

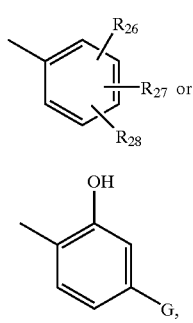

(Ia)

(Ib)

wherein

R$_{25}$ is hydrogen; C$_1$–C$_{18}$alkyl; C$_1$–C$_{18}$alkyl which is substituted by OH, —COOR$_{29}$;

R$_{24}$ is hydrogen; C$_1$–C$_{24}$alkyl or C$_5$–C$_{12}$cycloalkyl;

R$_{26}$, R$_{27}$ and R$_{28}$, independently of one another, are hydrogen, C$_1$–C$_{12}$alkyl or C$_1$–C$_{18}$alkoxy;

R$_{29}$ is C$_1$–C$_{18}$alkyl;

provided at least one G is an OR$_{25}$ group.

A substituent halogen is —F, —Cl, —Br or —I; preferably —F or —Cl, especially —Cl.

Alkylphenyl is phenyl substituted by alkyl; C$_7$–C$_{14}$alkylphenyl comprises, for example, methylphenyl (tolyl), dimethylphenyl(xylyl), trimethylphenyl(mesityl), ethylphenyl, propylphenyl, butylphenyl, dibutylphenyl, pentylphenyl, hexylphenyl, heptylphenyl, octylphenyl.

Glycidyl is 2,3-epoxypropyl.

Alkyl interrupted by O, N or S and unsubstituted or substituted by OH can in general, within the context of the scope of meaning set out, contain one or more of the said heteroatoms, where oxygen, nitrogen and sulfur atoms do not occur adjacently. In general, a heteroatom in the alkyl chain and hydroxyl are not vicinal; preferably, a carbon atom of the alkyl chain bonds to not more than one oxygen, nitrogen and sulfur atom.

C$_1$–C$_{20}$ alkoxy are straight-chain or branched radicals such as methoxy, ethoxy, propoxy, butoxy, pentyloxy, hexyloxy, heptyloxy, octyloxy, isooctyloxy, nonyloxy, undecyloxy, dodecyloxy, tetradecyloxy or pentadecyloxy, hexadecyloxy, heptadecyloxy, octadecyloxy, nonadecyloxy or eicosyloxy, for example.

Phenylalkyl is alkyl substituted by phenyl. C$_7$–C$_{20}$phenylalkyl comprises, for example, benzyl, α-methylbenzyl, α,α-dimethylbenzyl, phenylethyl, phenylpropyl, phenylbutyl, phenylpentyl, phenylhexyl, phenylheptyl, phenyloctyl, phenylnonyl, phenyldecyl, phenyldodecyl or phenyltetradecyl.

C$_4$–C$_{12}$cycloalkyl is, for example, cyclobutyl, cyclopentyl, cycloheptyl, cyclooctyl, cyclononyl, cyclodecyl, cycloundecyl, cyclododecyl and in particular, cyclohexyl.

Suitable examples of C$_4$–C$_{12}$cycloalkyl interrupted by one or more oxygen atoms are tetrahydrofuranyl, 1-oxa-4-cyclohexyl or 1,3-dioxa-4-cyclohexyl.

Within the context of the definitions indicated alkenyl comprises, inter alia, vinyl, allyl, isopropenyl, 2-butenyl, 3-butenyl, isobutenyl, n-penta-2,4-dienyl, 3-methyl-but-2-enyl, n-oct-2-enyl, n-dodec-2-enyl, iso-dodecenyl, n-dodec-2-enyl, n-octadec-4-enyl. R$_x$, R' and R" as alkenyl are preferably C$_2$–C$_{18}$alkenyl, especially vinyl or allyl, R$_y$ is preferably C$_3$–C$_{18}$alkenyl, especially allyl.

C$_2$–C$_{18}$alkanoyl is, for example, acetyl, propionyl, acryloyl, methacryloyl or benzoyl.

C$_1$–C$_{12}$cycloalkenyl is, for example, 2-cyclopenten-1-yl, 2,4-cyclopentadien-1-yl, 2-cyclohexen-1-yl, 2-cyclohepten-1-yl or 2-cycloocten-1-yl.

C$_4$–C$_{12}$cycloalkoxy is, for example, cyclobutyloxy, cyclopentyloxy, cyclohexyloxy, cycloheptyloxy, cyclooctyloxy, cyclononyloxy, cyclodecyloxy, cycloundecyloxy, cyclododecyloxy and, in particular, cyclohexyloxy.

Aryl is in general an aromatic hydrocarbon radical, for example phenyl, biphenylyl or naphthyl. Aralkyl is generally alkyl substituted by aryl; thus C$_7$–C$_{12}$aralkyl comprises, for example, benzyl, phenylethyl, phenylpropyl, phenylbutyl, phenylpentyl and phenylhexyl; benzyl and α-methylbenzyl are preferred. Alkylaryl is aryl substituted by alkyl; C$_7$–C$_{18}$alkylaryl comprises, inter alia, methylphenyl (tolyl), dimethylphenyl (xylyl), trimethylphenyl, tetramethylphenyl, pentamethylphenyl, ethylphenyl, propylphenyl (e.g. cumyl), butylphenyl (e.g. tert-butylphenyl), methylbutylphenyl, dibutylphenyl, pentylphenyl, hexylphenyl, dihexylphenyl, heptylphenyl, octylphenyl, nonylphenyl, decylphenyl, undecylphenyl, dodecylphenyl, methylnaphthyl, dimethylnaphthyl, ethylnaphthyl, propylnaphthyl, butylnaphthyl, pentyinaphthyl, hexylnaphthyl, heptyinaphthyl, octyinaphthyl; of these, those of particular importance are, for example, tolyl, xylyl, propylphenyl and butylphenyl.

Particular examples of C$_6$–C$_{12}$aryl are phenyl, naphthyl and biphenylyl.

Hetero-C$_3$–C$_{12}$aryl include pyridinyl, pyrimidinyl, triazinyl, pyrrolyl, furanyl, thiophenyl or quinolinyl.

$R_{25}$ as unsubstituted or substituted $C_5$–$C_{12}$cycloalkyl is, for example, cyclopentyl, cyclohexyl, cycloheptyl, cyclooctyl, cyclododecyl, methylcyclohexyl or acetyloxycyclohexyl; preference is given to cyclohexyl and cyclododecyl.

Where alkyl radicals carry further constituents or where individual radicals are alkylene, free valences and also bonds to substituents can start from the same carbon atom or from different carbon atoms. Preferably, bonds to heteroatoms start from different carbon atoms.

Thus $R_{25}$ as substituted $C_1$–$C_{12}$alkyl comprise, for example, hydroxyalkyl, such as 2-hydroxyethyl, 3-hydroxypropyl or 2-hydroxypropyl; alkoxyhydroxyalkyl, such as 2-hydroxy-3-methoxypropyl, 2-hydroxy-3-ethoxypropyl, 2-hydroxy-3-butoxypropyl, 2-hydroxy-3-hexoxypropyl or 2-hydroxy-3-(2-ethylhexyloxy)-propyl; alkoxycarbonylalkyl, such as methoxycarbonylmethyl, ethoxycarbonylmethyl, butoxycarbonylmethyl, octyloxycarbonylmethyl, 1-octyloxycarbonyl-1-methylmethyl, 1-octyloxycarbonyl-1-ethylmethyl or 1-octyloxycarbonyl-1-hexylmethyl; or alkanoyloxyalkyl or alkenoyloxyalkyl, such as 2-(acetyloxy)ethyl, 2-acryloxyethyl or 2-methacryloxyethyl; or, for example, 3-acryloxy- or 3-methacryloxy-2-hydroxypropyl.

$R_{25}$ as alkyl which is substituted by OH, alkoxy, phenoxy, —COOR$_{29}$, and/or —OCOR$_{32}$ comprises, for example, the following meanings:

—CH$_2$CH(OH)CH$_2$O—R$_{37}$, in which R$_{37}$ has one of the definitions indicated above for alkyl or can, for example, be phenyl, acetyl, propionyl, acryloyl or methacryloyl; or alkyloxycarbonylalkyl; examples of such radicals are —CH$_2$CH$_2$OCOCH=CH$_2$, —CH$_2$CH(OH)C$_8$H$_{17}$, —CH$_2$CH(OH)C$_{12}$H$_{25}$, —CH$_2$CH(OH)CH$_2$O-n-C$_8$H$_{17}$, —CH$_2$CH(OH)CH$_2$O—C$_6$H$_5$, —CH$_2$CH(OH)CH$_2$O—CH$_2$CH(C$_2$H$_5$)—(CH$_2$)$_3$—CH$_3$ —OCH$_2$CH(OH)CH$_2$OCOC(CH$_3$)=CH$_2$, —OCH$_2$CH(OH)CH$_2$OCOCH=CH$_2$.

Radicals referred to as acylamino or acyloxy, are preferably $C_2$–$C_{12}$acylamino or -acyloxy, respectively. Acyl is —CO—R, in which R is an organic radical containing in most cases 1–11 carbon atoms, generally $C_1$–$C_{11}$alkyl, $C_2$–$C_{11}$alkenyl, $C_6$–$C_{10}$aryl, $C_7$–$C_{11}$phenylalkyl or $C_7$–$C_{11}$alkylphenyl.

The compounds of the formula I are to a large extent known; examples of known compounds include
2,4,6-tris(2,4-dihydroxyphenyl)-1,3,5-triazine (Compound I)
2,4,6-tris(2-hydroxy-4-octyloxyphenyl)-1,3,5-triazine (Compound III),
2-(2-hydroxy-4-octyloxyphenyl)-4,6-bis(2,4-dimethylphenyl)-1,3,5-triazine, (Compound IV)
2-(2,4-dihydroxyphenyl)-4,6-bis(2,4-dimethylphenyl)-1,3,5-triazine, (Compound II)
2,4-bis(2-hydroxy-4-propyloxyphenyl)-6-(2,4-dimethylphenyl)-1,3,5-triazine,
2-(2-hydroxy-4-octyloxyphenyl)-4,6-bis(4-methylphenyl)-1,3,5-triazine,
2-(2-hydroxy-4-dodecyloxyphenyl)-4,6-bis(2,4-dimethylphenyl)-1,3,5-triazine,
2-(2-hydroxy-4-tridecyloxyphenyl)-4,6-bis(2,4-dimethylphenyl)-1,3,5-triazine,
2-[2-hydroxy-4-(2-hydroxy-3-butyloxypropyloxy)phenyl]-4,6-bis(2,4-dimethylphenyl)-1,3,5-triazine,
2-[2-hydroxy-4-(2-hydroxy-3-octyloxypropyloxy)phenyl]-4,6-bis(2,4-dimethylphenyl)-1,3,5-triazine,
2-[4-(dodecyloxy/tridecyloxy-2-hydroxypropoxy)-2-hydroxyphenyl]-4,6-bis(2,4-dimethyl-phenyl)-1,3,5-triazine,
2-[2-hydroxy-4-(2-hydroxy-3-dodecyloxypropoxy)phenyl]-4,6-bis(2,4-dimethylphenyl)-1,3,5-triazine,
2-(2-hydroxy-4-hexyloxy)phenyl-4,6-diphenyl-1,3,5-triazine,
2-(2-hydroxy-4-methoxyphenyl)-4,6-diphenyl-1,3,5-triazine,
2,4,6-tris[2-hydroxy-4-(3-butoxy-2-hydroxypropoxy)phenyl]-1,3,5-triazine,
2-(2-hydroxyphenyl)-4-(4-methoxyphenyl)-6-phenyl-1,3,5-triazine.

The triazine UV absorbers can be prepared by the general synthetic procedures outlined in U.S. Pat. Nos. 5,726,309; 5,681,955 and 5,556,973; British 2,317,714A, WO 96/28431 and EP 941989A2. The preparation of the compounds of the formula I is, for example, in accordance with or in analogy to one of the methods indicated in EP-A-434,608, WO-96-28,431 or in the publication by H. Brunetti and C. E. Lüthi, Helv. Chim. Acta 55, 1566 (1972), by the Friedel-Crafts reaction of halotriazines with the corresponding phenols.

Examples of Selected Resorcinol Triazines Compounds

Compound I
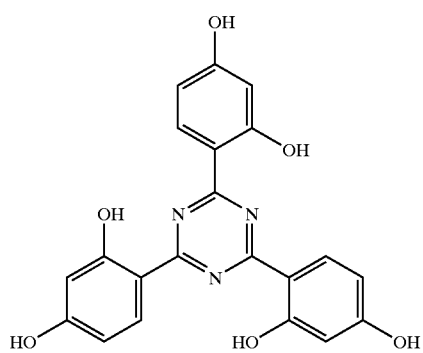

Compound II
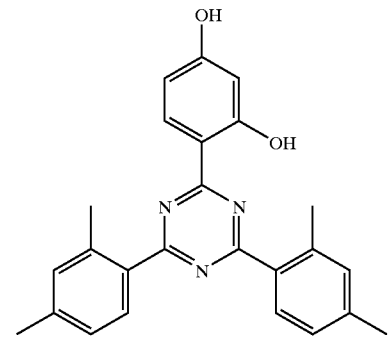

Compound III
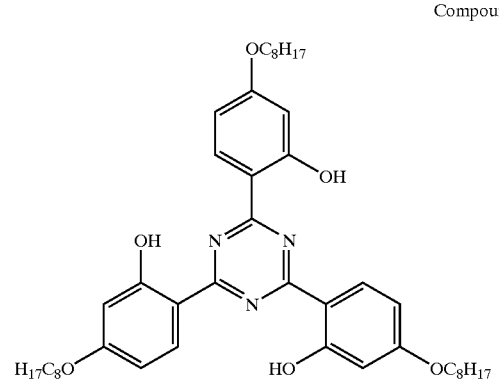

Compound IV

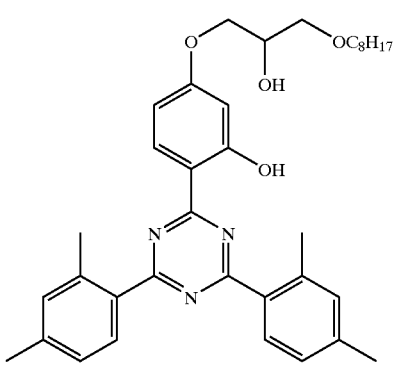

Compound V

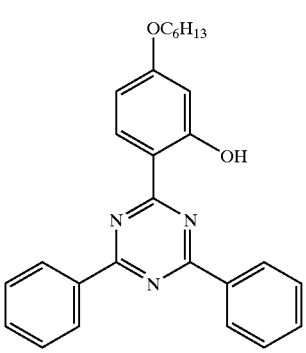

Compound VI

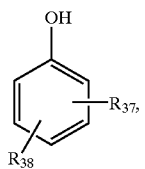

Other(hetero)aromatic hydroxyl-containing compounds can be selected from:

(II)

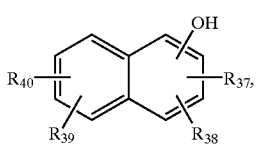

(III)

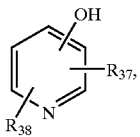

(IV)

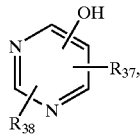

(V)

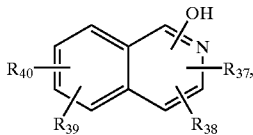

(VI)

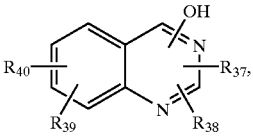

(VII)

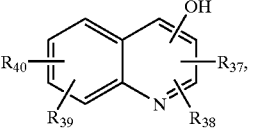

(VIII)

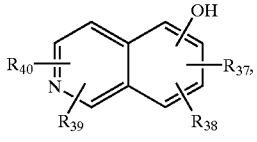

(IX)

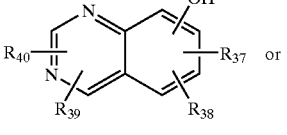

(X)

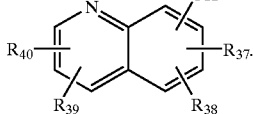 or (XI)

wherein $R_{37}$, $R_{38}$, $R_{39}$ and $R_{40}$ are, independently of one another, hydrogen, OH, $C_1-C_{20}$alkyl, $C_1-C_{20}$alkoxy, Cl, Br, F, COOH; $COOR_{29}$; CN; $CON(R_{30})_2$; $N(R_{30})_2$; $NO_2$. (Hetero)aromatic compounds are more preferred wherein $R_{37}$, $R_{38}$, $R_{39}$ and $R_{40}$ are, independently of one another, hydrogen, OH, $C_1-C_{20}$alkyl, $C_1-C_{20}$alkoxy, Cl, Br, F and COOH. Particularly preferred (hetero)aromatic compounds have only one or two rings per molecule and up to three hydroxyl groups bonded to at least one such ring, as exemplified in the examples. Aromatic and heteroaromatic compounds, as the terms are used herein, do not encompass compounds that contain a pigment residue, such as quinacridone sulfonic acid and its salts, phthalimidomethylquinacridone, imidazolylmethylquinacridone, pyrazolylmethylquinacridone, and diaryldiketopyrrolopyrrole sulfonic acid and its salts.

Particularly suitable aromatic compounds for this invention contain one or more aromatic rings having at least one hydroxyl group. The aromatic rings can be further substituted with alkyl and/or carboxy groups. Examples of aromatic compounds are phenol, cresol, thymol, disubstituted naphthol, phenanthrol, pyrocatechol, and bicyclic hydroxyl-containing compounds linked by alkylene, carbonyl, oxyl, and/or sulfonyl groups. Further examples include resorcinol, hydroquinone, naphthol, phloroglucinol, dihydroxybenzoic acid, pyrogallol, naphthoquinone and dihydroxy-2-napthoic acid.

Another suitable class of additives are naphthoquinones exemplified by formula XII below:

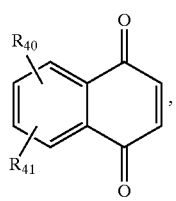

(XII)

where $R_{40}$ and $R_{41}$ are, independently of one another, selected from hydrogen, $C_1$–$C_4$alkyl, $C_1$–$C_4$alkoxy, or halogen, such as Cl, Br, or F.

Synthesis of crystal phase specific quinacridones using non-pigmentary additives is a direct and efficient method, the additives are soluble in the alkaline medium employed for the reaction and can be removed from the product at the end of the reaction by simple washing. Depending on the selected additive of the present invention a gamma-I, a gamma-II or a gamma-III crystal phase of quinacridone can be prepared in excellent yields. Solid solutions of different quinacridones with high transparency can also be prepared using these additives in the peroxide oxidation process.

Accordingly, the present invention relates also to a composition comprising:

a) a quinacridone precursor represented by formulae A

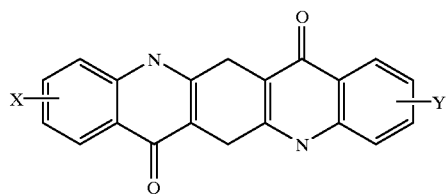

A in which X and Y, independently of one another, are hydrogen, halogen, $C_1$–$C_4$alkyl or $C_1$–$C_4$alkoxy, and b) an effective amount of a (hetero)aromatic hydroxyl or keto group containing compound of formula I–XII and c) optionally an oxidizing agent.

The resorcinol triazine derivatives are efficient ultraviolet (UV) ray absorbers. After the oxidation they can be incorporated into pigments by simple neutralization of the reaction mixture as these products are not soluble in water. This would give additional protection for the pigments from light fading.

Therefore, a further aspect of the present invention is a composition comprising:

a) a quinacridone represented by formula B

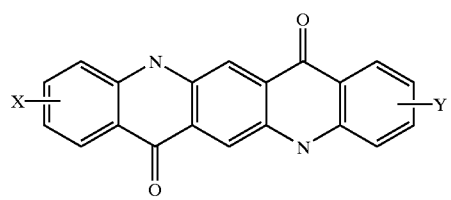

B in which X and Y are independently 1 or 2 substituents selected from the group consisting of H, F, Cl, $C_1$–$C_4$alkyl and $C_1$–$C_4$alkoxy, and b) an effective amount of a (hetero)aromatic hydroxyl-containing compound of formula I, i.e. a composition consisting of the quinacridone of formula B and (hetero)aromatic hydroxyl-containing compound of formula I.

In general, an effective amount of the compounds of the formula I is from about 1 to about 20% by weight of the stabilized composition, although this will vary with the particular substrate and application. An advantageous range is form 1 to 5%, preferably 1.5 to 2.5%.

The additives of the present invention can also be used in the oxidation of dihydroquinacridones employing either sodium meta nitro benzene sulfonate or air as the oxidizing agent. The additives of the present invention can also be used during the quinacridone synthesis by the cyclization of 2,5-dianilinoteretphthalic acid in presence of polyphosphoric acid as described in U.S. Pat. Nos. 3,257,405 and 5,755,873.

A specific crystal phase of quinacridone can be prepared, e.g. hydrogen peroxide oxidation of 6,13-dihydroquinacridone in presence of resorcinol triazine derivative (I) produces gamma-I phase quinacridone, likewise a similar oxidation driven by the addition of catechol, resorcinol, hydroquinone and phloroglucinol created not only gamma-I quinacridone but they also modified the particle size of the resulting pigment.

It has been reported in U.S. Pat. Nos. 4,197,404 and 5,457,203 that phthalimidomethyl-quinacridone derivative when employed in a gamma phase specific oxidation of 6,13-dihydroquinacridone results in a pigment with higher tinting strength. However, when the same oxidation was performed at higher than 1% of phthalimidomethylquinacridone, the oxidation reaction did not go to completion. Therefore it is very surprising that, even at 3 to 10% level, the aromatic additives described above do not curtail the conversion yields of the oxidation reactions. It is also unexpected that the aromatic hydroxy compounds described above generate commercially useful purely polymorphic quinacridones in excellent yields in an economically attractive manner.

While the hydroquinone assisted hydrogen peroxide oxidation of 6,13-dihydroquinacridone produces a gamma-I quinacridone, surprisingly a combination of hydroquinone and pyrazolylmethyl quinacridone generates a gamma-II quinacridone. It is further surprising that the oxidation of 6,13-dihydroquinacridone in the presence of 2-naphthol creates a gamma-III quinacridone.

Further, co-oxidation of two or more dihydroquinacridones result in very attractive solid solutions corresponding to the composition employed in the oxidation, suggesting that the oxidation procedure of the present invention is fairly general. The aromatic hydroxy compounds described above appear to act as crystal size and/or phase directors during the oxidation reaction and are washed at the end of the reaction leaving clean pigments. Consequently, another aspect of the present invention is the use of (hetero)aromatic hydroxyl or keto group containing compounds of formula I–XII as phase directors and/or particle size reducers. This aspect is again of commercial significance as there are no complications arising due to incompatibility of these aromatic hydroxy compounds in the end use applications of the pigments. Thus, by the expedient use of the additives of the present invention, it is possible to produce a variety of commercially useful quinacridone pigments in an environmentally friendly and economically attractive manner.

Transparent quinacridones or solid solutions of quinacridones can be prepared. e.g. a certain mixture of 6,13-dihydroquinacridone and 2,9-dichloro-6,13-dihydroquinacridone upon peroxide oxidation in the presence of resorcinol triazine derivatives (i) gives a solid solution of quinacridone and 2,9-dichloroquinacridone of the corresponding composition.

The addition of as little as 3–10%, alternatively 3–5%, by weight, relative to the dihydroquinacridone, of the aromatic (heteroaromatic) hydroxy compounds of the present invention makes a significant difference in the synthesis, by directing the crystal phase to gamma-I, gamma-II or gamma-III or by creating a solid solution of the particular composition. Without the additive, the oxidation process produces a beta quinacridone starting with 6,13-dihydroquinacridone. In the case of mixed dihydroquinacridone oxidations, assisted by the additives of the present invention, highly desirable small particle size pigments with excellent color properties are produced.

The instant process is especially useful for the preparation of unsubstituted quinacridone, 2,9-dichloroquinacridone, 2,9-difluoroquinacridone, 4,11-dichloroquinacridone, 2,9-dimethylquinacridone and 2,9-dimethoxyquinacridone. Additionally, the process is also suitable for the preparation of solid solutions containing one or more quinacridone components. Thus, an aspect of this invention relates to the process wherein a mixture containing two or more 6,13-dihydroquinacridones of "formula A" which are co-oxidized by the inventive process to yield a quinacridone solid solution product. The process of this invention is particularly practical for the preparation of quinacridone/2,9-dichloroquinacridone, quinacridone/4,11-dichloroquinacridone, quinacridone/2,9-dimethylquinacridone, quinacridone/2,9-dimethoxyquinacridone, 2,9-dichloroquinacridone/2,9-dimethylquinacridone, 2,9-dichloroquinacridone/2,9-dimethoxyquinacridone or 2,9-dimethylquinacridone/2,9-dimethoxyquinacridone solid solution pigments.

Depending on the end use, it may be advantageous to add texture improving agents and/or rheology improving agents, for example before the isolation of the pigment, preferably by blending into the aqueous presscake. Suitable texture improving agents are, in particular, fatty acids of not less than 18 carbon atoms, for example stearic or behenic acid or the amides or metal salts thereof, preferably calcium or magnesium salts, as well as plasticizers, waxes, resin acids such as abietic acid or metal salts thereof, colophonium, alkyl phenols or aliphatic alcohols such as stearyl alcohol or vicinal diols such as dodecanediol-1,2, and also modified colophonium/maleate resins or fumaric acid/colophonium resins or polymeric dispersants. The texture improving agents are preferably added in amounts of 0.1 to 30% by weight, most preferably of 2 to 15% by weight, based on the final product.

Suitable rheology improving agents are for example the above mentioned antiflocculating agents, which are added preferably in amounts of 2 to 10% by weight, most preferably of 3 to 8% by weight, based on the final product.

The present quinacridone and quinacridone solid solution pigments are suitable as coloring matter for inorganic or organic substrates. They are highly suitable for coloring high molecular weight materials, which can be processed to casted and molded articles or which are used in ink and coating compositions such as solvent or water based coatings, for example in automotive coatings. Preferred high molecular weight materials are plastics that are subsequently calendered, cast, molded or processed to fibers and industrial or automotive paints or ink coatings.

Suitable high molecular weight organic materials include thermoplastics, thermoset plastics or elastomers, for example, cellulose ethers; cellulose esters such as ethyl cellulose; linear or crosslinked polyurethanes; linear, crosslinked or unsaturated polyesters; polycarbonates; polyolefins such as polyethylene, polypropylene, polybutylene or poly-4-methylpent-1-ene; polystyrene; polysulfones; polyamides; polycycloamides; polyimides; polyethers; polyether ketones such as polyphenylene oxides; and also poly-p-xylene; polyvinyl halides such as polyvinyl chloride, polyvinylidene chloride, polyvinylidene fluoride or polytetrafluoroethylene; acrylic and methacrylic polymers such as polyacrylates, polymethacrylates or polyacrylonitrile; rubber; silicone polymers; phenol/formaldehyde resins; melamine/formaldehyde resins; urea/formaldehyde resins; epoxy resins; diene rubbers or copolymers thereof such as styrene butadiene rubber; acrylonitrile-butadiene rubber or chloroprene rubber; singly or in mixtures.

Generally, the pigments are used in an effective pigmenting amount, for example, of 0.01 to 30% by weight, preferably 0.1 to 10% by weight, based on the weight of the high molecular weight organic material to be pigmented. Thus, the present invention also relates to a pigmented plastic composition which comprises a plastic material and an effective pigmenting amount of a pigment or pigment solid solution prepared according to a process of the present invention, and to a process for preparing said pigmented plastic compositions.

The present pigments are easily dispersible and can be readily incorporated into organic matrixes to provide homogenous colorations possessing high saturation and excellent light and weather fastness properties.

The high molecular weight organic materials are pigmented with the pigments of the present invention by mixing the pigments, if desired in the form of a masterbatch, into substrates using high shear techniques including roll mills or a mixing or grinding apparatus. The pigmented material is then brought into the desired final form by known methods, such as calandering, pressing, extruding, brushing, casting or injection molding.

The following examples further describe embodiments of this invention. In these examples all parts given are by weight unless otherwise indicated. The x-ray diffraction patterns are measured on a RIGAKU GEIGERFLEX diffractometer type D/MaxII v BX.

EXAMPLES

The following examples are for illustrative purposes only and are not to be construed to limit the instant invention in any manner whatsoever.

Example 1

Comparative

To a one liter four necked round bottomed flask equipped with a reflux condenser, a mechanical paddle-blade stirrer and a thermocouple element is added 6,13-dihydroquinacridone (36 grams; 0.114 mole) and dispersed in methanol (210 ml). An aqueous solution of sodium hydroxide (45.8 g; 0.537 mole; 50%) is added slowly over 10 minutes using a dropping funnel and the viscous dispersion stirred at 55° C. for 1 h. To this is added sodium anthraquinone monosulfonate (0.5 grams) and the mixture heated to reflux. To the resulting mixture is added an aqueous solution of hydrogen peroxide (34.0 ml; 0.175 mole; 16.9%) at a rate of 0.15 ml/min, using a Brinkmann pump. After the addition, the reaction mixture is stirred at reflux for an additional 10 minutes, then water (100 ml) is added. The product is filtered, washed with water until pH 7.5–8.0 and then dried in an air oven at 80° C. overnight to give 34.5 g of a dark brown powder. The product shows a $\beta_{1/2}$ value of 0.306 at 5.9 2θ, corresponding to beta-quinacridone (FIG. 1).

Example 2

Figure 2:
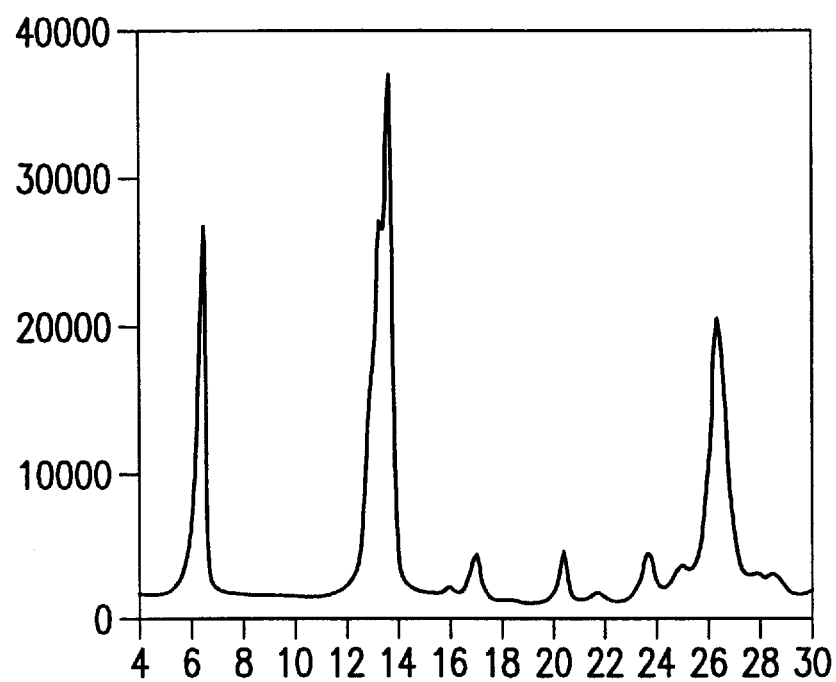
FIG. 2 is an X-ray diffraction pattern for the product of example 2.

To a one liter four necked round bottomed flask equipped with a reflux condenser, a mechanical paddle-blade stirrer and a thermocouple element is added 6,13-dihydroquinacridone (36 grams; 0.114 mole) and dispersed in methanol (210 ml). An aqueous solution of sodium hydroxide (45.8 g; 0.537 mole; 50%) is added slowly over 10 minutes using a dropping funnel and the viscous dispersion stirred at 55° C. for 1 h. To this are added the resorcinol triazine derivative (compound 1, 1.08 grams, 3%) and sodium anthraquinone monosulfonate (0.5 grams) and the mixture heated to reflux. To the resulting mixture is added an aqueous solution of hydrogen peroxide (34.0 ml; 0.175 mole; 16.9%) at a rate of 0.15 ml/min, using a Brinkmann pump. After the addition, the reaction mixture is stirred at reflux for an additional 10 minutes, then water (100 ml) is added. The product is filtered, washed with water until pH 7.5–8.0 and then dried in an air oven at 80° C. overnight to give 32.2 g of a red powder. The product shows a $\beta_{1/2}$ value of 0.312 at 6.5 2θ, corresponding to gamma-I-quinacridone (FIG. 2). This experiment proves the gamma-I-directing effect of compound I.

Example 3

Figure 3:
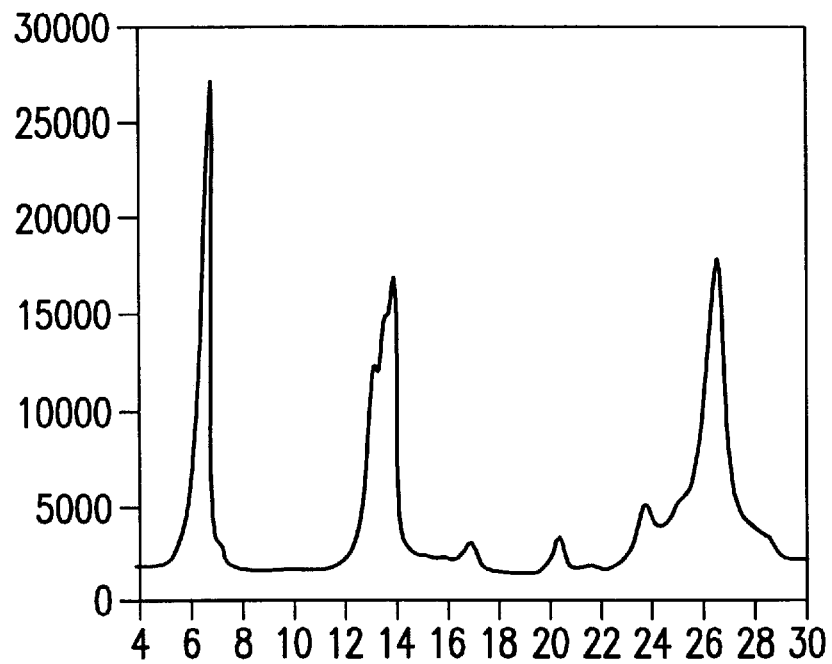
FIG. 3 is an X-ray diffraction pattern for the product of example 3.

Example 2 is repeated except a higher concentration of compound 1 (3.6 grams, 10% by weight relative to dihydroquinacridone) is added prior to hydrogen peroxide addition. The product showed a $\beta_{1/2}$ value of 0.354 at 6.6 2θ, corresponding to gamma-I-quinacridone (FIG. 3). This product shows higher transparency than the product of example 2. This experiment proves that compound I acts not only as a gamma-I phase director but also as particle size reducer.

Example 4

Comparative

Figure 4:
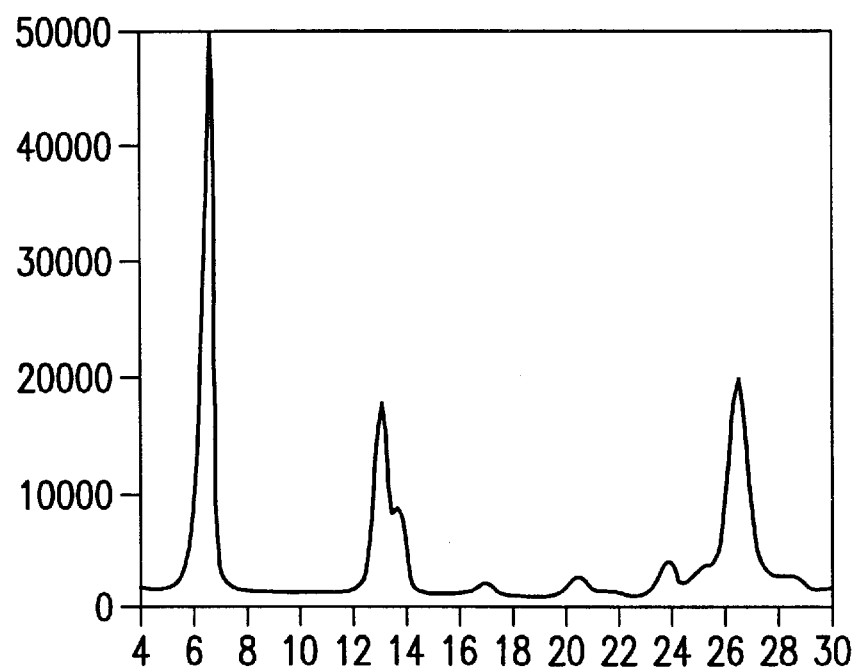
FIG. 4 is an X-ray diffraction pattern for the product of example 4.

Example 2 is repeated except that instead of compound 1, pyrazolylmethyl quinacridone (1% by weight relative to dihydroquinacridone; 2.19 g in paste form at 16.43% concentration in water) is added prior to hydrogen peroxide addition. The product (35.1 grams) shows a value of 0.446 at 6.6 2θ, corresponding to gamma-III-quinacridone (FIG. 4).

Example 5

Figure 5:
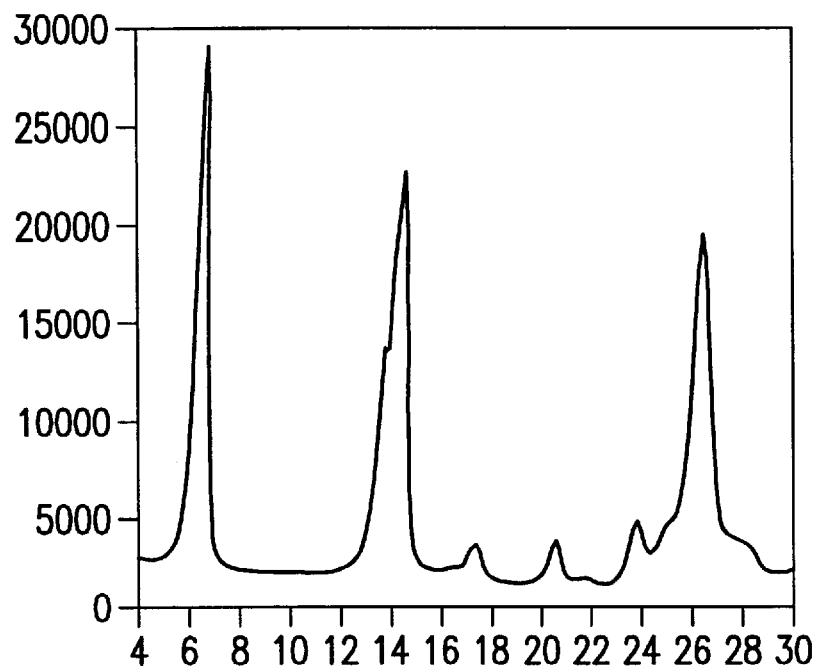
FIG. 5 is an X-ray diffraction pattern for the product of example 5.

Example 2 is repeated except that instead of compound 1, a mixture of compound 1(1.08 grams, 3% by weight relative to dihydroquinacridone) and pyrazolylmethyl quinacridone (1% by weight relative to dihydroquinacridone; 2.19 g in paste form at 16.43% concentration in water) is added prior to hydrogen peroxide addition. The product (35.4 grams) shows a $\beta_{1/2}$ value of 0.398 at 6.5 2θ, corresponding to gamma-I-quinacridone (FIG. 5). This experiment proves the gamma-I-directing effect of compound 1. This product shows higher transparency than the product of example 2.

Example 6

Figure 6:
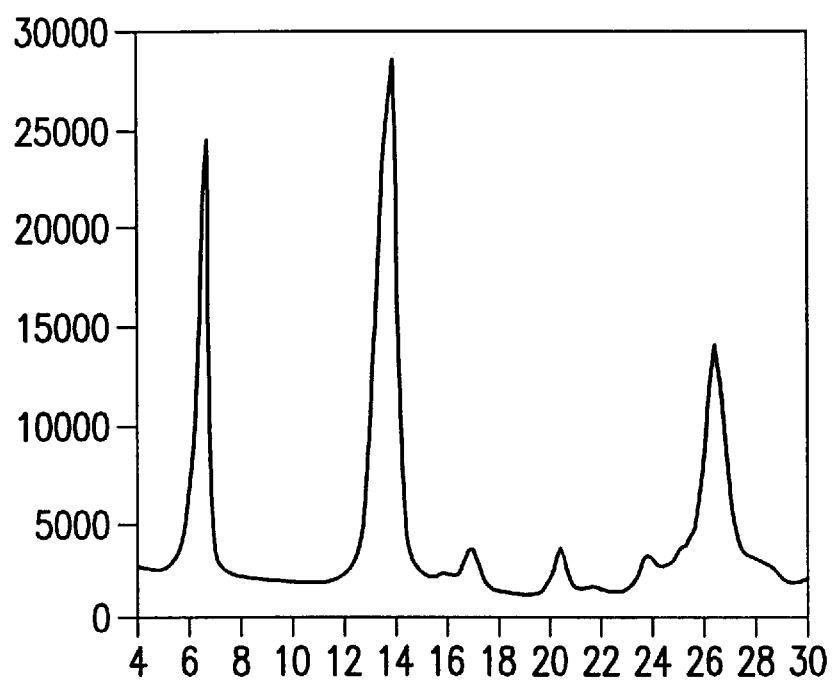
FIG. 6 is an X-ray diffraction pattern for the product of example 6.

Example 2 is repeated except that instead of compound 1, a mixture of compound 1(1.08 grams, 3% by weight relative to dihydroquinacridone) and phthalimidomethyl quinacridone (0.36 grams, 1% by weight relative to dihydroquinacridone) is added prior to hydrogen peroxide addition. The product (35.1 grams) shows a $\beta_{1/2}$ value of 0.398 at 6.5 2θ, corresponding to gamma-I-quinacridone (FIG. 6). This product showed higher transparency than the product of example 2.

Example 7

Comparative

Figure 7:
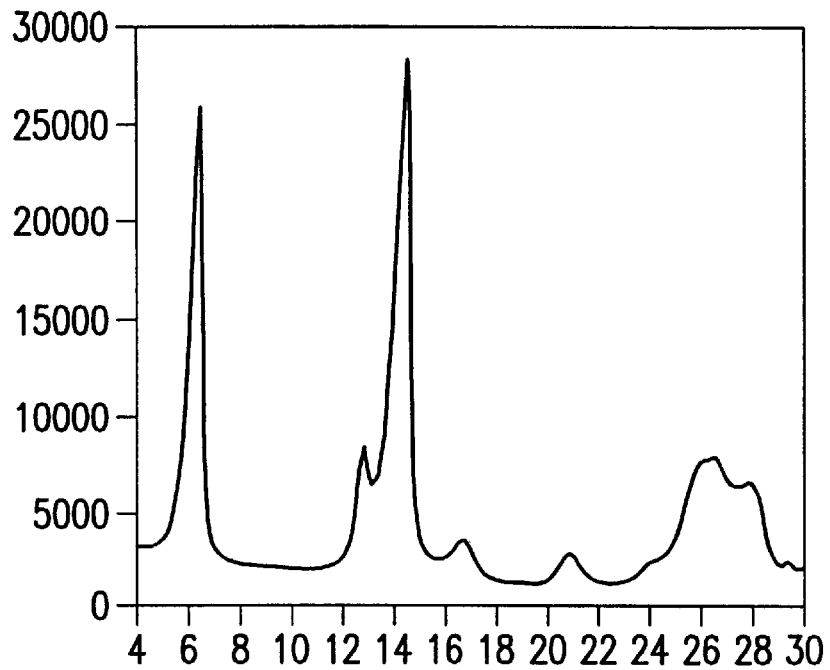
FIG. 7 is an X-ray diffraction pattern for the product of example 7.

To a one liter four necked round bottomed flask equipped with a reflux condenser, a mechanical paddle-blade stirrer and a thermocouple element is added 6,13-dihydroquinacridone (35 g; 0.111 mole) and dispersed in methanol (230 ml). An aqueous solution of sodium hydroxide (53.5 grams; 0.668 mole; 50%) is added slowly over 10 minutes using a dropping funnel and the viscous dispersion stirred at 55° C. for 1 h. To this are added phthalimidomethyl quinacridone (1.2 grams, 3.4%) and sodium anthraquinone monosulfonate (0.5 grams) and the mixture heated to reflux for 1 h. To the resulting mixture is added an aqueous solution of hydrogen peroxide (61 ml; 0.315 mole; 16.9%) at a rate of 0.3 ml/min, using a peristaltic pump. After the addition, the reaction mixture is stirred at reflux for an additional 10 minutes, then water (100 ml) is added. The product is filtered, washed with water until pH 7.5–8.0 and then dried in an air oven at 80° C. overnight to give 27.9 g of a red powder. The product shows a $\beta_{1/2}$ value of 0.511 at 6.2 2θ, corresponding to alpha-quinacridone (FIG. 7).

Example 8

Figure 8:
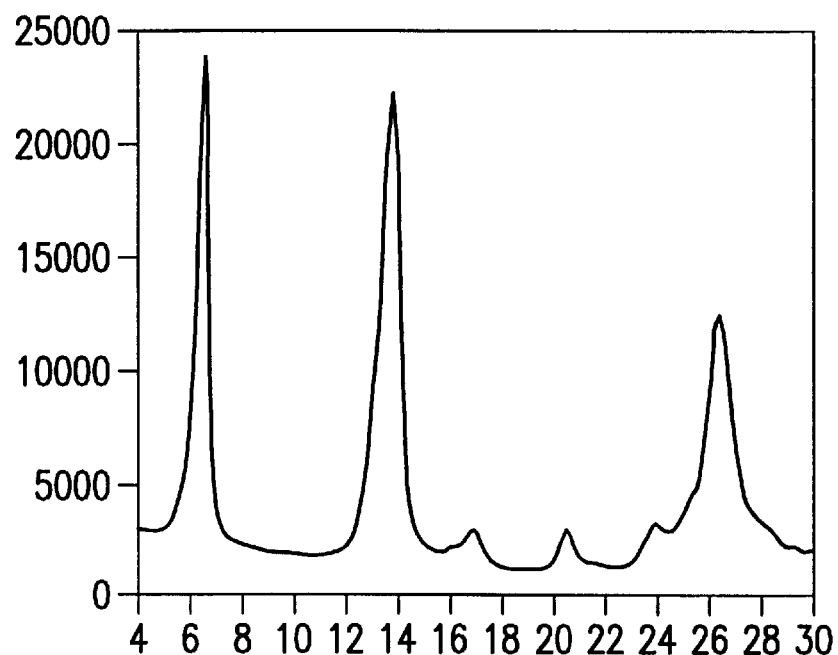
FIG. 8 is an X-ray diffraction pattern for the product of example 8.

Example 7 is repeated except that compound 1 (1.1 grams; 3.1% by weight relative to dihydroquinacridone), is added along with dihydroquinacridone. The product (27.5 grams) shows a $\beta_{1/2}$ value of 0.471 at 6.5 2θ, corresponding to gamma-I-quinacridone (FIG. 8).

Example 9

Figure 9:
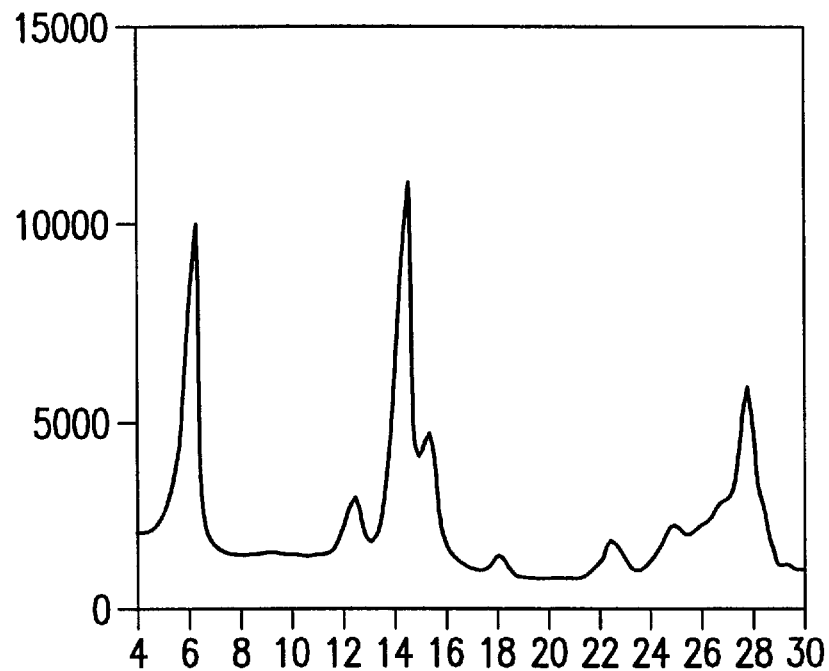
FIG. 9 is an X-ray diffraction pattern for the product of example 9.
Figure 10:
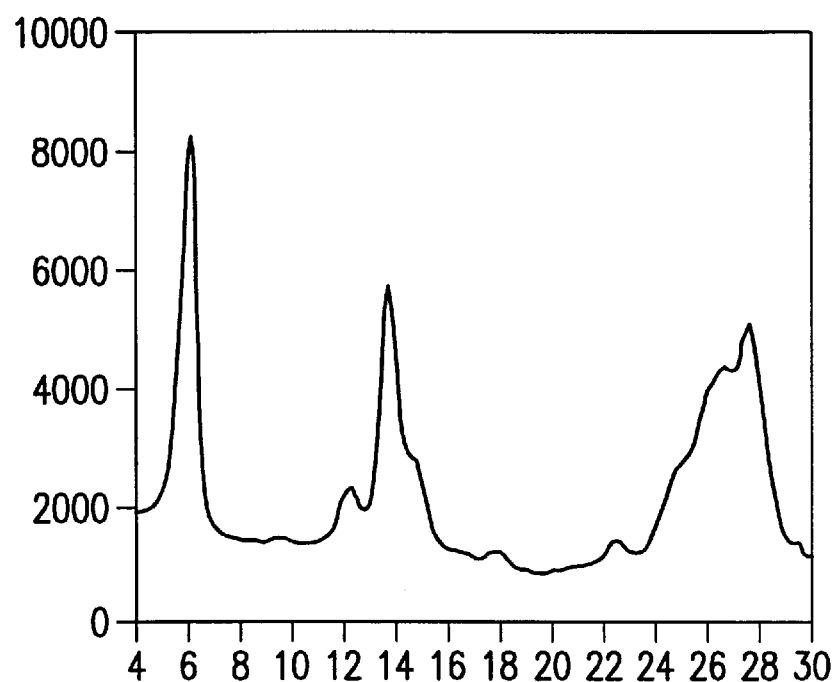
FIG. 10 is an X-ray diffraction pattern for the product of example 10.

Example 7 is repeated except that instead of dihydroquinacridone, a mixture of 6,13-dihydroquinacridone (26 grams) and 2,9-dichloro-6,13-dihydroquinacridone (11 grams) is added. The product (29.2 grams) shows a $\beta_{1/2}$ value of 0.520 at 6.0 2θ, corresponding to a quinacridone solid solution (FIG. 9).

Example 10

Example 9 is repeated except that compound 1 (1.1 grams; 3.1% by weight relative to dihydroquinacridone) is added along with a mixture of 6,13-dihydroquinacridone and 2,9-dichloro-6,13-dihydroquinacridone. The product (25.2 grams) shows a $\beta_{1/2}$ value of 0.650 at 6.0 2θ, corresponding to a quinacridone solid solution (FIG. 8). This compound is more transparent than the product of example 9, indicating it is smaller in particle size than that of example 9.

Example 11

Comparative

Figure 11:
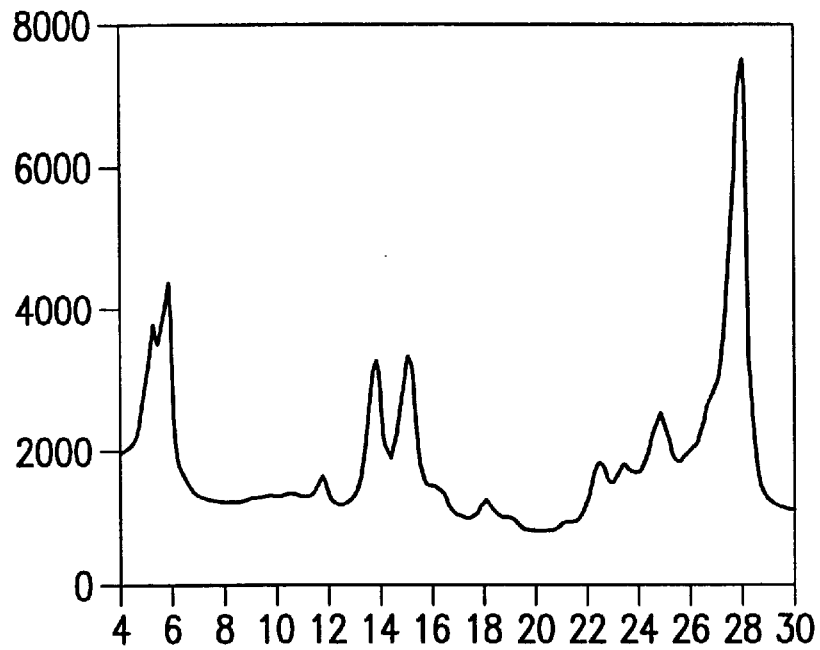
FIG. 11 is an X-ray diffraction pattern for the product of example 11.

To a one liter four necked round bottomed flask equipped with a reflux condenser, a mechanical paddle-blade stirrer and a thermocouple element are added 6,13-dihydroquinacridone (18 g; 0.057 mole) and 2,9-dichloro-6,13-dihydroquinacridone (27 g; 0.07 mole) and dispersed in methanol (230 ml). An aqueous solution of sodium hydroxide (53.5 grams; 0.668 mole; 50%) is added slowly using a dropping funnel and the viscous dispersion stirred at 55° C. for 1 h. To this are added phthalimidomethyl quinacridone (1.5 grams; 3.3%) and sodium anthraquinone monosulfonate (0.5 grams) and the mixture heated to reflux. To the resulting mixture is added an aqueous solution of hydrogen peroxide (74 ml; 0.384 mole; 16.9%) at a rate of 0.3 ml/min, using a Brinkmann pump. After the addition, the reaction mixture is stirred at reflux for an additional 10 minutes, then water (100 ml) is added. The product is filtered, washed with water until pH 7.5–8.0 and then dried in an air oven at 80° C. overnight to give 41.0 g of a dark red powder (FIG. 11).

Example 12

Figure 12:
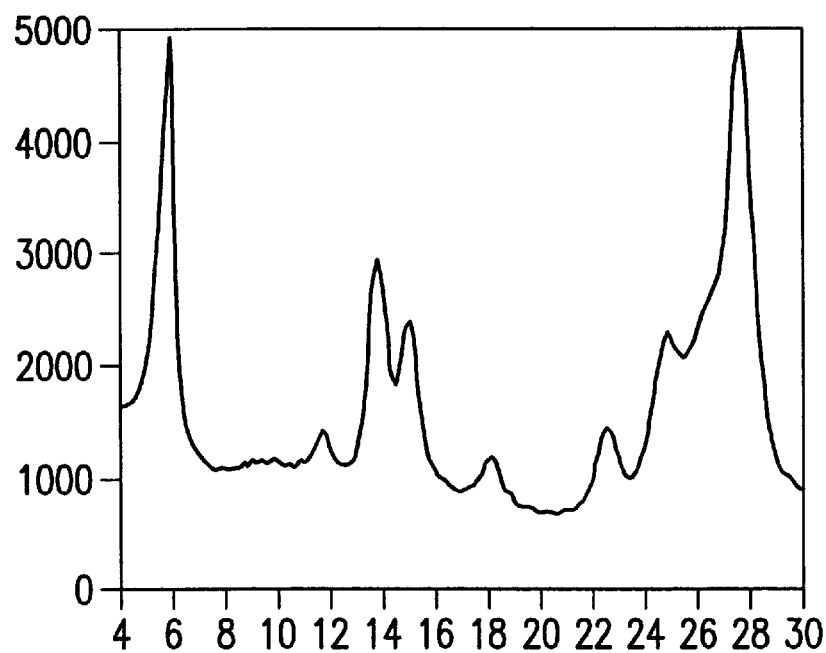
FIG. 12 is an X-ray diffraction pattern for the product of example 12.

Example 11 is repeated except that compound 1(1.5 grams; 3.5% by weight relative to dihydroquinacridone) is added after the addition of phthalimidomethylquinacridone. This compound is more transparent than the product of example 11 by rub-out, indicating it is smaller in particle size (FIG. 12).

Example 13

Figure 13:
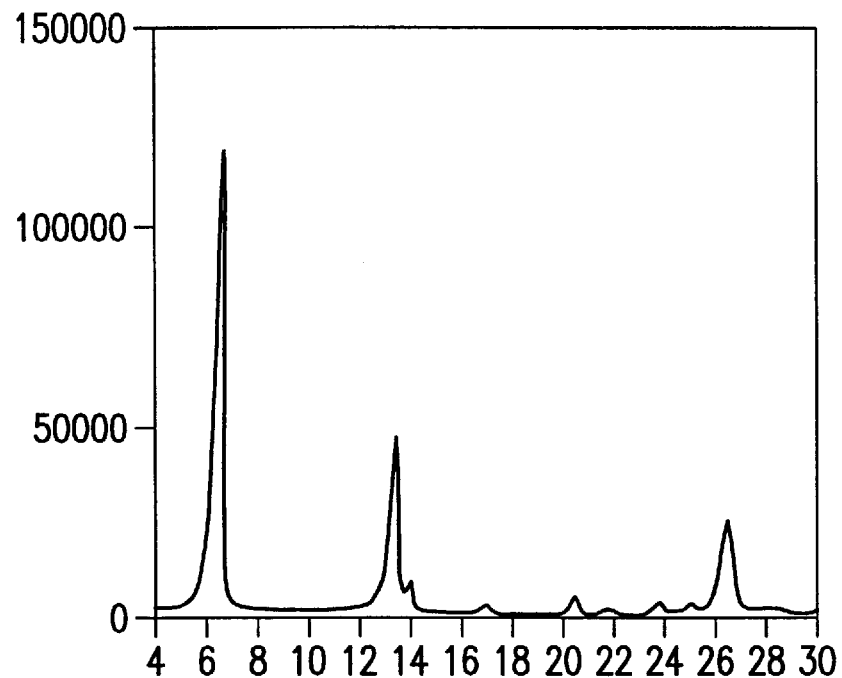
FIG. 13 is an X-ray diffraction pattern for the product of example 13.

Example 2 is repeated except that instead of compound 1, compound 2 (1.08 grams; 3% by weight relative to dihydroquinacridone) is added prior to hydrogen peroxide addition. The product (35 grams) shows a $\beta_{1/2}$ value of 0.322 at 6.5 2θ, corresponding to gamma-III-quinacridone (FIG. 13).

Example 14

Comparative

To a one liter four necked round bottomed flask equipped with a thermometer, a stirrer and a reflux condenser are added 6,13-dihydroquinacridone (36.0 grams; 0.1145 mole) and methanol (207 ml). This mixture is stirred at moderate speed for 15 minutes to ensure a uniform slurry. An aqueous sodium hydroxide solution (45.8 grams; 0.572 mole; 50%) is added to the slurry and the mixture stirred at 55° C. for 1 hour. After the addition of sodium anthraquinone monosulfonate (0.45 grams) the slurry is heated to reflux. To the resulting mixture is added an aqueous solution of hydrogen peroxide (67.5 grams; 16.85%) at a rate of 0.3 ml/min using a Cole-Parmer peristaltic pump. After complete addition, the reaction mixture is stirred for 15 minutes, then water (100 ml) is added. The product is filtered, washed with hot water until the filtrate pH is 8.5 or less and the filtrate conductivity is equal to or less than 110% that of the wash water. The violet colored solid product obtained (Yield: 35.9 grams; 99.72%) after drying in an oven at 80° C. is pulverized. The product showed an X-ray diffraction pattern of a beta quinacridone. The rubout data indicated a brownish purple masstone and a dull tint identical to a beta quinacridone crude of large particle size.

Example 15

To a one liter four necked round bottomed flask equipped with a thermometer, a stirrer and a reflux condenser are added 6,13-dihydroquinacridone (36.0 grams; 0.1145 moles), catechol (1.08 grams) and methanol (207 ml). This mixture is stirred at moderate speed for 15 minutes to ensure a uniform slurry. To this slurry are added an aqueous sodium hydroxide solution (45.8 grams; 50%) and this mixture is stirred at 55° C. for 1 hour. After the addition of sodium anthraquinone monosulfonate (0.45 grams) the slurry is heated to reflux. To the resulting mixture is added an aqueous solution of hydrogen peroxide (67.5 grams; 16.85%) at a rate of 0.3 ml/min using a Cole-Parmer peristaltic pump. After complete addition, the reaction mixture is stirred for 15 min, then water (100 ml) is added. The product is filtered, washed with hot water until the filtrate pH is 8.5 or less and the filtrate conductivity is equal to or less than 110% that of the wash water. The red colored solid product obtained (Yield: 35.9 grams; 99.72%) after drying in an oven at 80° C. is pulverized. The product showed an X-ray diffraction pattern of a gamma-I quinacridone. The rubout data indicated a very attractive small particle size blue shade red.

Catechol Drives the Reaction to the Gamma-I Crystal Modification of Quinacridone

Example 16

Example 15 is repeated except resorcinol (1.08 grams) is used instead of catechol. The red colored solid product obtained (Yield: 35.9 grams; 99.72%) after drying in an oven at 80° C. is pulverized. The product showed an X-ray diffraction pattern of a gamma-I quinacridone. The rubout data indicated a semi-opaque red pigment.

Resorcinol Drives the Reaction to the Gamma-I Crystal Modification of Quinacridone

Example 17

Example 15 is repeated except hydroquinone (1.08 grams) is used instead of catechol. The red colored solid product obtained (Yield: 35.9 grams; 99.72%) after drying in an oven at 80° C. is pulverized. The product showed an X-ray diffraction pattern of a gamma-I quinacridone. The rubout data indicated an opaque yellow shade red pigment.

Hydroquinone Drives the Reaction to the Gamma-I Crystal Modification of Quinacridone

Example 18

Example 15 is repeated except phloroglucinol (1.08 grams) is used instead of catechol. The red colored solid product obtained (Yield: 35.9 grams; 99.72%) after drying in an oven at 80° C. is pulverized. The product showed an X-ray diffraction pattern of a gamma-I quinacridone. The rubout data indicated an opaque yellow shade red pigment.

Phloroglucinol Drives the Reaction to the Gamma-I Crystal Modification of Quinacridone

Example 19

Example 15 is repeated except 2-naphthol (1.08 grams) is used instead of catechol. The dark red colored solid product obtained (Yield: 35.9 grams; 99.72%) after drying in an oven at 80° C. is pulverized. The product showed an X-ray diffraction pattern of a gamma-III quinacridone. The rubout data indicated a very blue shade red of an extremely small particle size pigment.

2-Naphthol Directs the Reaction to the Gamma-III Crystal Modification of Quinacridone

Example 20

Example 15 is repeated except 3,4-dihydroxybenzoic acid (1.08 grams) is used instead of catechol. The red colored solid product obtained (Yield: 35.9 grams; 99.72%) after drying in an oven at 80° C. is pulverized. The product showed an X-ray diffraction pattern of a gamma-I quinacridone of large particle size. The rubout data indicated an opaque yellow shade red pigment.
3,4-Dihydroxybenzoic Acid Promotes the Reaction to the Gamma-I Crystal Modification of Quinacridone

Example 21

Example 15 is repeated except pyrogallol (1.08 grams) is used instead of catechol. The red colored solid product obtained (Yield: 35.9 grams; 99.72%) after drying in an oven at 80° C. is pulverized. The product showed an X-ray diffraction pattern of a gamma-I quinacridone. The rubout data indicated a very attractive small particle size blue shade red.
Pyrogallol Drives the Reaction to the Gamma-I Crystal Modification of Quinacridone

Example 22

Example 15 is repeated except 1,4-naphthoquinone (1.08 grams) is used instead of catechol. The red colored solid product obtained (Yield: 35.9 grams; 99.72%) after drying in an oven at 80° C. is pulverized. The product showed an X-ray diffraction pattern of a gamma-I quinacridone. The rubout data indicated a small particle size blue shade red.
1,4-Naphthoquinone Drives the Reaction to the Gamma-I Crystal Modification of Quinacridone

Example 23

Example 15 is repeated except 1,4-dihydroxy-2-naphthoic acid (1.08 grams) is used instead of catechol. The red colored solid product obtained (Yield: 35.9 grams; 99.72%) after drying in an oven at 80° C. is pulverized. The product showed a very well resolved X-ray diffraction pattern of a gamma-I quinacridone. The rubout data indicated a semi-opaque Yellow shade.
1,4-Dihydroxy-2-naphthoic acid Promotes the Reaction to the Gamma-I Crystal Modification of Quinacridone

Example 24

To a one liter four necked round bottomed flask equipped with a thermometer, a stirrer and a reflux condenser are added 2,9-dichloro-6,13-dihydroquinacridone (18.0 grams; 0.047 moles), 6,13-dihydroquinacridone (27.0 grams; 0.086 moles), catechol (1.08 grams) and methanol (185 ml). This mixture is stirred at moderate speed for 15 minutes to ensure a uniform slurry. To this slurry is added aqueous sodium hydroxide solution (64.2 grams; 50%) and this mixture is stirred at reflux for 1 hour and sodium anthraquinone monosulfonate (0.5 grams) is added. To the resulting mixture is added an aqueous solution of hydrogen peroxide (67.5 grams; 16.85%) at a rate of 0.3 ml/min using a Cole-Parmer peristaltic pump. After complete addition, the reaction mixture is stirred for 15 min, then water (100 ml) is added. The product is filtered, washed with hot water until the filtrate pH is 8.5 or less and the filtrate conductivity is equal to or less than 110% that of the wash water. The magenta colored solid product obtained (Yield: 44.9 grams; 99.78%) after drying in an oven at 80° C. is pulverized. The product showed an X-ray diffraction pattern of a binary solid compound of 2,9-dichloroquinacridone and unsubstituted quinacridone. The rubout data indicated a very attractive medium particle size blue shade red pigment.
The Pigment is a Unique Binary Solid Compound Wherein Both 2,9-dichloroquinacridone and Unsubstituted Quinacridone Loose Their Individual Identity to Attain the New Crystal Structure.

Example 25

To a one liter four necked round bottomed flask equipped with a thermometer, a stirrer, an inlet tube and a condenser are added 2,9-dichloro-6,13-dihydroquinacridone (40.0 grams; 0.1044 moles), 6,13-dihydroquinacridone (5.0 grams; 0.0159 moles), catechol (1.08 grams) and methanol (280 ml). This mixture is stirred at moderate speed for 15 minutes to ensure a uniform slurry. To this slurry is added aqueous potassium hydroxide solution (136.8 grams; 45%) and this mixture is stirred at reflux for 1 hour and sodium anthraquinone monosulfonate (0.5 grams) is added. To the resulting mixture is added an aqueous solution of hydrogen peroxide (67.5 grams; 16.85%) at a rate of 0.3 ml/min using a Cole-Parmer peristaltic pump. After complete addition, the reaction mixture is stirred for 15 min, then water (100 ml) is added. The product is filtered, washed with hot water until the filtrate pH is 8.5 or less and the filtrate conductivity is equal to or less than 110% that of the wash water. The magenta colored solid product obtained (Yield: 44.9 grams; 99.78%) after drying dried in an oven at 80° C. is pulverized. The product showed an X-ray diffraction pattern of a gamma phase 2,9-dichloroquinacridone. The rubout data indicated a very attractive medium particle size magenta pigment.
Catechol Promotes Solid Solution Formation. The Pigment is a Host-Guest Solid Solution of 2,9-dichloroquinacridone and Unsubstituted Quinacridone Wherein 2,9-dichloroquinacridone Serves as a Host to Unsubstituted Quinacridone

Example 26

To a one liter four necked round bottomed flask equipped with a thermometer, a stirrer, a condenser are added 6,13-dihydroquinacridone (24.0 grams; 0.0764 moles), 2,9-dichloro-6,13-dihydroquinacridone (16.0 grams; 0.0418 moles), catechol (1.2 grams) and methanol (202 ml). This mixture is stirred at moderate speed for 15 minutes to ensure a uniform slurry. To this slurry is added aqueous potassium hydroxide solution (159.4 grams; 45%), while keeping the temperature below 50° C. The slurry is stirred efficiently at 50–60° C. for 15 minutes. To this slurry are added sodium meta nitro benzoate (23.0 grams) followed by water (26.0 ml.). This reaction mixture is heated to reflux and maintained at reflux temperature for 3 hours. The reaction mixture is quenched with methanol (100 ml.) followed by water (100 ml.) and the stirring continued for 15 minutes. The slurry is filtered, washed with aqueous methanol (50%) followed by hot tap water until the filtrate pH is 8.5 or less and the filtrate conductivity is equal to or less than 110% that of the wash water. The blue shade red colored solid product obtained (Yield: 39.8 grams; 99.5%) is dried in an oven at 80° C. and pulverized. The product showed an X-ray diffraction pattern of a binary solid compound of 2,9-dichloroquinacridone and unsubstituted quinacridone. The rubout data indicated a very attractive medium particle size blue shade red pigment.
The Pigment is a Unique Binary Solid Compound Wherein Both 2,9-dichloroquinacridone and Unsubstituted Quinacridone Loose Their Individual Identity to Attain the New Crystal Structure

Example 27

Figure 14:
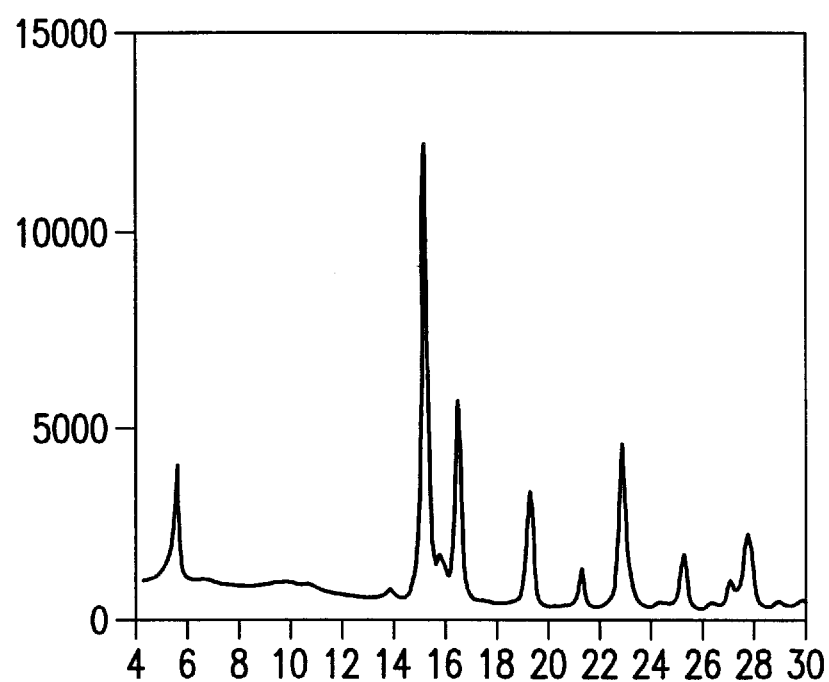
FIG. 14 is an X-ray diffraction pattern for the product of example 27.

To a one liter four necked round bottomed flask equipped with a reflux condenser, a mechanical paddle-blade stirrer and a thermocouple element is added 2,9-dichloro-6,13-dihydroquinacridone (45.0 g; 0.117 mole) and dispersed in methanol (280 ml). An aqueous solution of potassium hydroxide (137 grams, 45%, 1.04 mole) is added slowly using a dropping funnel and the reaction mixture is stirred at 60° C. for 1 h. Before the dispersion is heated to reflux, sodium anthraquinone monosulfonate, (0.5 grams, 0.2 mmole) is added. To the resulting mixture is added dropwise an aqueous solution of hydrogen peroxide (74 ml; 16.9%; 0.384 mole) at a rate of 0.3 ml/min, using a Brinkmann pump. After the addition, the reaction mixture is stirred for an additional 10 minutes, then water (100 ml) is added. The product is filtered, washed with water (till pH 7.5–8.0) and then dried in an air oven at 80° C. overnight to give 43.1 g of dark magenta powder. The product showed an X-ray diffraction pattern of a gamma phase 2,9-dichloroquinacridone (FIG. 14).

Example 28

Figure 15:
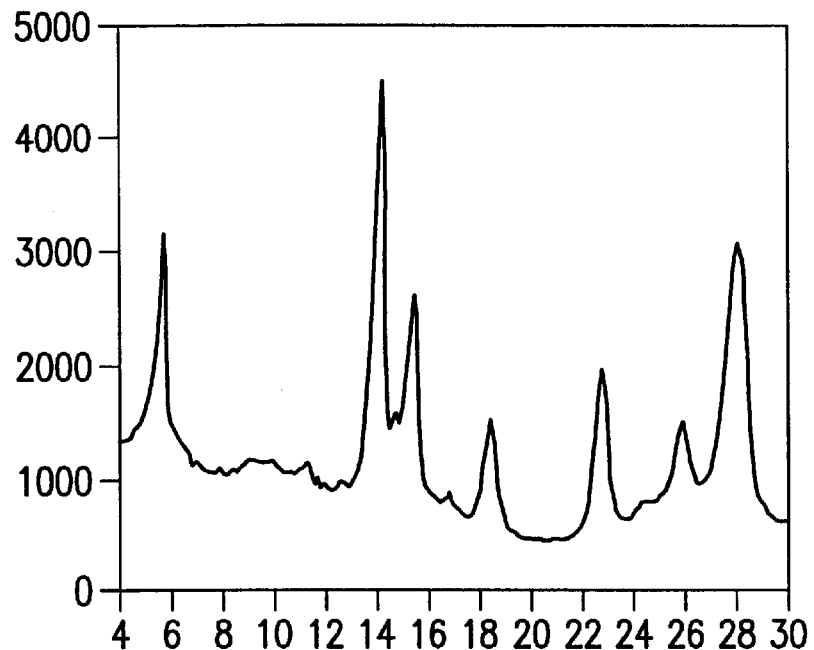
FIG. 15 is an X-ray diffraction pattern for the product of example 28.

Example 27 is repeated except that compound 1 (1.5 grams, 3.3% by weight relative to the dichloro dihydroquinacridone) is added prior to hydrogen peroxide addition. The product (41.6 grams) showed an X-ray diffraction pattern of an alpha phase 2,9-dichloroquinacridone (FIG. 15).

Example 29

Comparative

Figure 16:
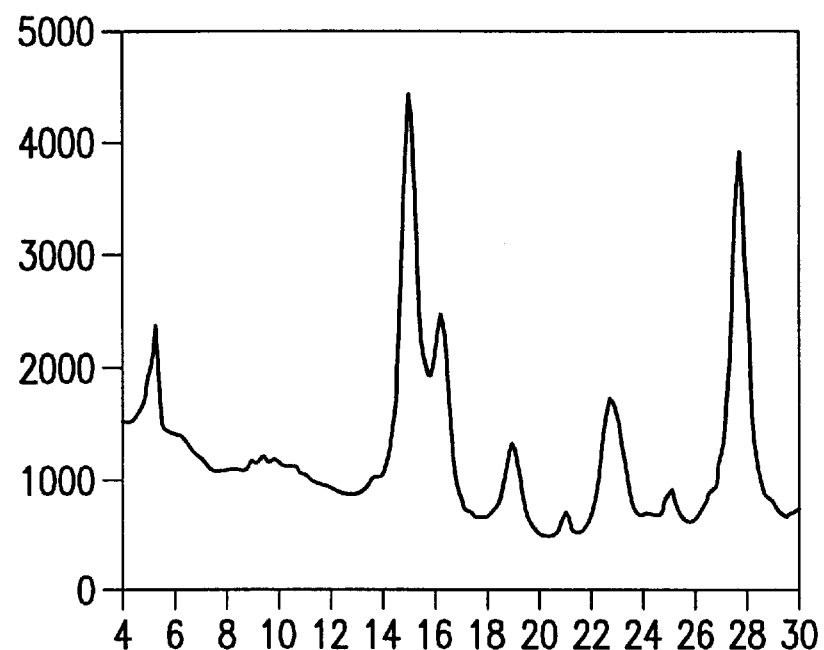
FIG. 16 is an X-ray diffraction pattern for the product of example 29.

Example 27 is repeated except that instead of compound 1, phthalimidomethyl quinacridone (1.5 grams, 3.3% by weight relative to the dichloro dihydroquinacridone) is added prior to hydrogen peroxide addition. The product (42.4 grams) showed an X-ray diffraction pattern of a gamma phase 2,9-dichloroquinacridone (FIG. 16).

Example 30

Figure 17:
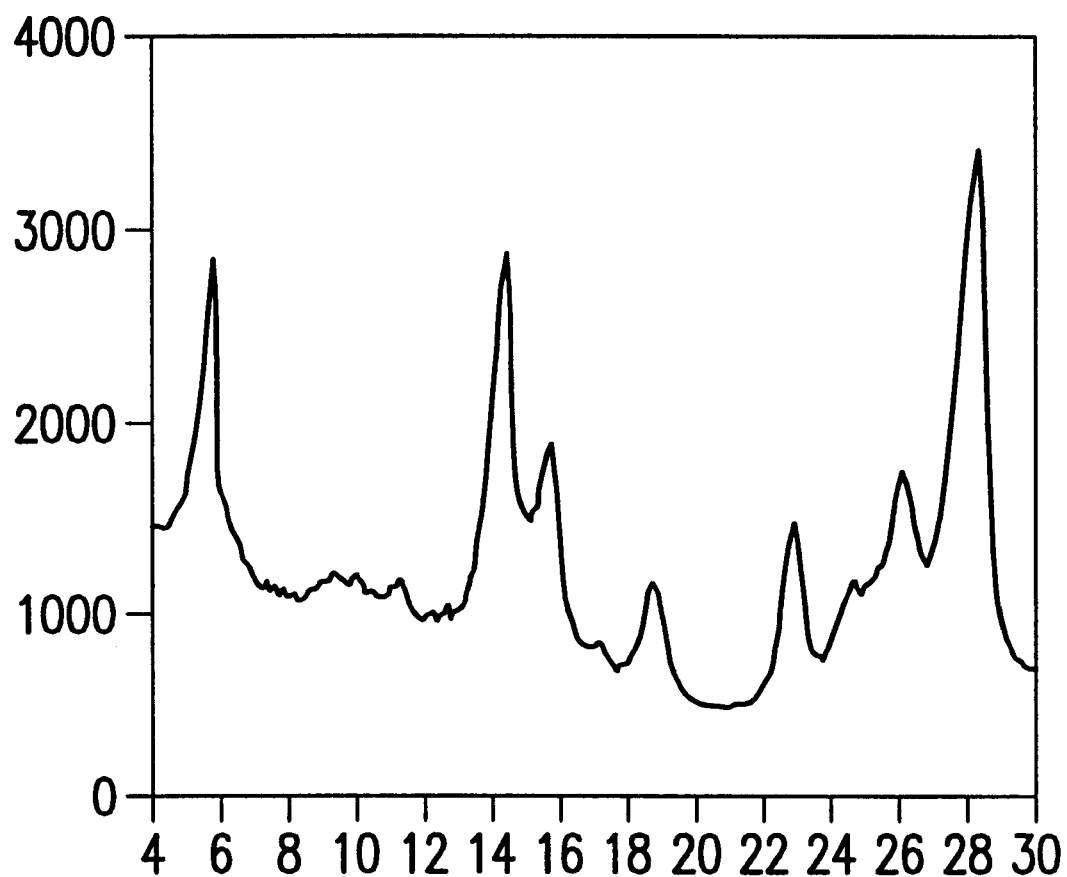
FIG. 17 is an X-ray diffraction pattern for the product of example 30.

Example 27 is repeated except that a mixture of compound 1(1.5 grams, 3.3% by weight relative to the dichloro dihydroquinacridone) and phthalimidomethyl quinacridone (1.5 grams, 3.3% by weight relative to the dichloro dihydroquinacridone) is added prior to hydrogen peroxide addition. The product (42.4 grams) showed an X-ray diffraction pattern of an alpha phase 2,9-dichloroquinacridone (FIG. 17). The rub-out showed it is a yellow shade magenta and more transparent than the product of example 27.

What is claimed is:

1. A process for producing a quinacridone pigment according to formula B

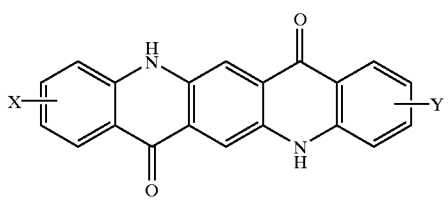

or a solid solution thereof,
comprising oxidizing a salt of a corresponding 6,13-dihydroquinacridone of formula A or a mixture of two or more 6,13-dihydroquinacridones of formula A

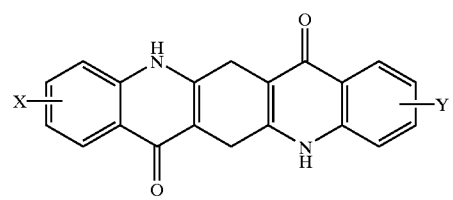

in which X and Y are independently 1 or 2 substituents selected from the group consisting of H, F, Cl, $C_1$–$C_4$ alkyl and $C_1$–$C_4$ alkoxy, in the presence of at least one (hetero)aromatic hydroxyl containing compound that does not contain a pigment moiety and an oxidizing agents, wherein the (hetero)aromatic hydroxyl-containing compound is a compound of formula I

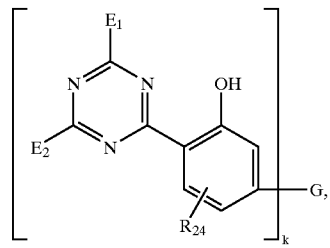

wherein
k is 1 or 2 and
when k=1, G is hydrogen or —$OR_{25}$
$E_1$ and $E_2$ in dependently of one another, are a group of the formula Ia or Ib

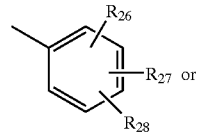

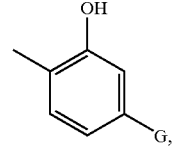

wherein
$R_{25}$ is hydrogen; $C_1$–$C_{18}$alkyl; $C_1$–$C_{18}$alkyl which is substituted by OH, halogen, —COOH, —$COOR_{29}$, —$CONH_2$, —$CONHR_{30}$, —$CON(R_{30})(R_{31})$, —$NH_2$, $NHR_{30}$, —$N(R_{30})(R_{31})$, —$NHCOR_{32}$, —CN, $COR_{32}$, —$OCOR_{32}$, phenoxy and/or $C_1$–$C_{18}$alkyl-, $C_1$–$C_{18}$alkoxy- or halo-substituted phenoxy; $C_3$–$C_{50}$alkyl which is interrupted by —O— and can be substituted by OH; $C_3$–$C_6$alkenyl; glycidyl; $C_5$–$C_{12}$cycloalkyl; $C_5$–$C_{12}$cycloalkyl substituted by OH, $C_1$–$C_4$alkyl or —$OCOR_{32}$; $C_7$–$C_{11}$phenylalkyl which is unsubstituted or substituted by OH, Cl, $C_1$–$C_{18}$alkoxy or $C_1$–$C_{18}$alkyl; —$COR_{32}$ or —$SO_2$—

$R_{33}$; or a radical of one of the formulae

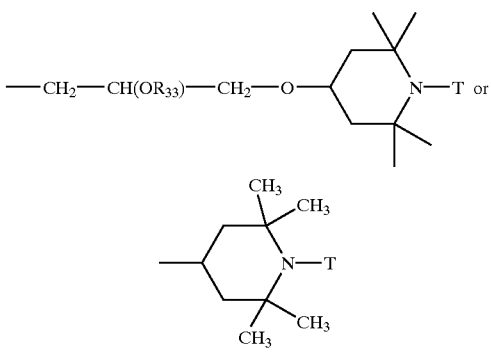

wherein

T is hydrogen; $C_1$–$C_8$alkyl; $C_2$–$C_8$alkyl which is substituted by one or more hydroxyl groups or by one or more acyloxy groups; oxyl; hydroxyl; —CH$_2$CN; $C_1$–$C_{18}$alkoxy; $C_5$–$C_{12}$cycloalkoxy; $C_3$–$C_6$alkenyl; $C_7$–$C_9$phenylalkyl; $C_7$–$C_9$phenylalkyl which is substituted once, twice or three times in the phenyl ring by $C_1$–$C_4$alkyl; or is aliphatic $C_1$–$C_8$alkanoyl;

$R_{24}$ is hydrogen; $C_1$–$C_{24}$alkyl or $C_5$–$C_{12}$cycloalkyl; or is $C_1$–$C_{24}$alkyl or $C_5$–$C_{12}$cycloalkyl which is substituted by 1 to 9 halogen atoms, OH, $OR_{25}$, halogen, —COOH, —COOR$_{29}$, —CONH$_2$, —CONHR$_{30}$, —CON(R$_{30}$)(R$_{31}$), —NH$_2$, NHR$_{30}$, —N(R$_{30}$)(R$_{31}$), —NHCOR$_{32}$, —CN, COR$_{32}$, —OCOR$_{32}$, —CN, —NO$_2$, —SR$_{32}$, —SOR$_{32}$, —SO$_2$R$_{32}$, —P(O)(OR$_{25}$)$_2$, a morpholinyl, piperidinyl, 2,2,6,6-tetramethylpiperidinyl, piperazinyl or N-methylpiperazinyl group or by combinations thereof; or is $C_5$–$C_{12}$cycloalkyl or $C_1$–$C_{24}$alkyl which is interrupted by 1 to 6 phenylene, —O—, —NR$_{29}$—, —CONR$_{29}$—, —COO—, —OCO—, —CH(R$_{33}$)—, —C(R$_{33}$)$_2$— or —CO— groups or combinations thereof; or $R_{24}$ is $C_2$–$C_{24}$alkenyl; halogen; —SR$_{32}$, SOR$_{32}$; SO$_2$R$_{32}$; —SO$_3$H; or SO$_3$M;

$R_{26}$, $R_{27}$ and $R_{28}$, independently of one another, are H, $C_1$–$C_{12}$alkyl; $C_2$–$C_6$alkenyl; $C_1$–$C_{18}$alkoxy; $C_5$–$C_{12}$cycloalkoxy; $C_2$–$C_{18}$alkenoxy; halogen; —C≡N; $C_1$–$C_4$haloalkyl; $C_7$–$C_{11}$phenylalkyl; COOR$_{29}$; CONH$_2$; —CONHR$_{30}$; —CON(R$_{30}$)(R$_{31}$); sulfo; $C_2$–$C_{18}$acylamino; OCOR$_{32}$; phenyloxy; or phenyloxy, which is substituted by $C_1$–$C_{18}$alkyl, $C_1$–$C_{18}$alkoxy or halogen;

$R_{29}$ is $C_1$–$C_{18}$alkyl; $C_3$–$C_{18}$alkenyl; $C_3$–$C_{50}$alkyl which is interrupted by O, NH, NR or S and/or is substituted by OH; glycidyl; $C_5$–$C_{12}$cycloalkyl; $C_1$–$C_4$alkylcyclohexyl; phenyl; $C_7$–$C_{14}$alkylphenyl; $C_6$–$C_{15}$bicycloalkyl; $C_6$–$C_{15}$bicycloalkenyl; $C_6$–$C_{15}$tricycloalkyl; $C_6$–$C_{14}$bicycloalkylalkyl; or $C_7$–$C_{11}$phenylalkyl;

$R_{30}$ and $R_{31}$, independently of one another are $C_1$–$C_{12}$alkyl; $C_3$–$C_{12}$alkoxyalkyl; $C_2$–$C_{18}$alkanoyl; $C_4$–$C_{16}$dialkylaminoalkyl or $C_5$–$C_{12}$cycloalkyl; or $R_{30}$ and $R_{31}$ together are $C_3$–$C_9$alkylene or -oxaalkylene or -azaalkylene;

$R_{32}$ is $C_1$–$C_{18}$alkyl; $C_1$–$C_{12}$alkoxy; $C_2$–$C_{18}$alkenyl; $C_7$–$C_{11}$phenylalkyl; $C_7$–$C_{11}$phenylalkoxy; $C_6$–$C_{12}$cycloalkyl; $C_6$–$C_{12}$cycloalkoxy; phenoxy or phenyl; or is $C_3$–$C_{50}$alkyl which is interrupted by —O— and can be substituted by OH;

$R_{33}$ is $C_1$–$C_{18}$alkyl; $C_2$–$C_{18}$alkenyl; $C_6$–$C_{12}$cycloalkyl; provided at least one G is an —OR$_{25}$ group;

when k=2, $E_1$ and $E_2$ are a group of the formula Ia;

G is $C_2$–$C_{16}$alkylene, $C_4$–$C_{12}$alkenylene, xylylene, $C_3$–$C_{20}$alkylene which is interrupted by O and/or substituted by OH, or a group of the formula
—CH$_2$CH(OH)CH$_2$O—R$_{34}$—OCH$_2$CH(OH)CH$_2$—, —CO—R$_{35}$—CO—, —CO—NH—R$_{36}$—NH—CO—,
—(CH$_2$)$_j$—COO—G$_{20}$—OOC—(CH$_2$)$_j$—, in which j is a number from the range from 1 to 3, or

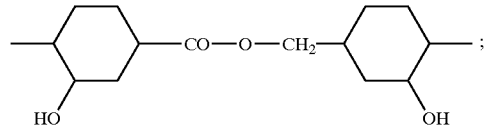

$R_{34}$ is $C_2$–$C_{10}$alkylene; $C_4$–$C_{50}$alkylene which is interrupted by O, phenylene, or a group -phenylene-E-phenylene-, in which E is —O—, —S—, —SO$_2$—, —CH$_2$—, —CO—, or —C(CH$_3$)$_2$—;

$R_{35}$ is $C_2$–$C_{10}$alkylene, $C_2$–$C_{10}$oxaalkylene, $C_2$–$C_{10}$thiaalkylene, $C_6$–$C_{12}$arylene or $C_2$–$C_6$alkenylene;

$R_{36}$ is $C_2$–$C_{10}$alkylene, phenylene, tolylene, diphenylenemethane or a group of the formula

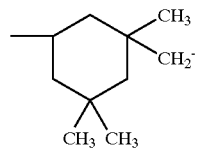

M is alkali metal.

2. A process for producing a guinacridone pigment according to formula B

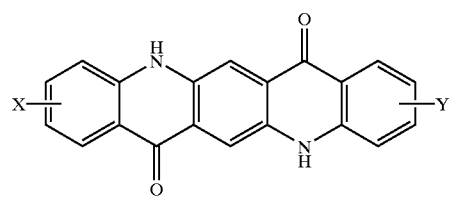

or a solid solution thereof, comprising oxidizing a salt of a corresponding 6,13-dihydroguinacridone of formula A or a mixture of two or more 6,13-dihydroguinacridones of formula A

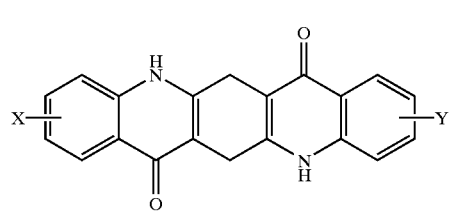

in which X and Y are independently 1 or 2 substituents selected from the group consisting of H, F, Cl, $C_1$–$C_4$ alkyl and $C_1$–$C_4$ alkoxy, in the presence of at least one (hetero)aromatic hydroxyl or keto group containing compound that does not contain a pigment moiety and an oxidizing agent, wherein the (hetero)aromatic hydroxyl or keto group containing compound is a compound of formulae II–XI

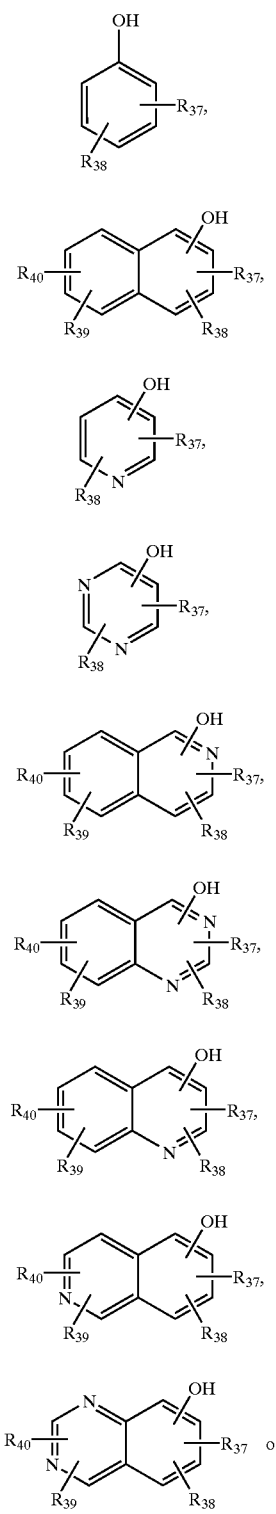

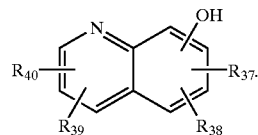

wherein $R_{37}$, $R_{38}$, $R_{39}$ and $R_{40}$ are, independently of one another, hydrogen, OH, $C_1$–$C_{20}$alkyl, $C_1$–$C_{20}$alkoxy, Cl, Br, F, COOH; $COOR_{29}$; CN; $CON(R_{30})_2$; $N(R_{30})_2$; wherein $R_{29}$ and $R_{30}$ are as defined in claim 2; and $NO_2$ or a naphthoquinone exemplified by formula XII

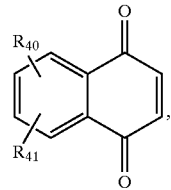

where $R_{40}$ and $R_{41}$ are, independently of one another, selected from hydrogen, $C_1$–$C_4$alkyl, $C_1$–$C_4$alkoxy, or halogen, such as Cl, Br, or F.

3. A process according to claim 1 wherein the (hetero) aromatic compound is

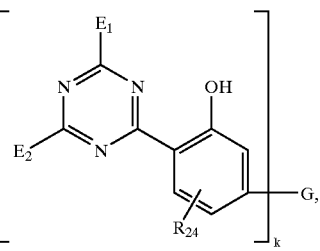

wherein
G is hydrogen or —$OR_{25}$,
k is 1,
$E_1$ and $E_2$, independently of one another, are a group of the formula Ia or Ib

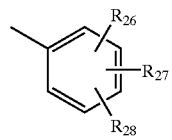

or

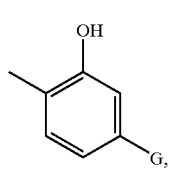

wherein
$R_{25}$ is hydrogen; $C_1$–$C_{18}$alkyl; $C_1$–$C_{18}$alkyl which is substituted by OH, —$COOR_{29}$;
$R_{24}$ is hydrogen; $C_1$–$C_{24}$alkyl or $C_5$–$C_{12}$cycloalkyl;

$R_{26}$, $R_{27}$ and $R_{28}$, independently of one another, are hydrogen, $C_1$–$C_{12}$alkyl or $C_1$–$C_{18}$alkoxy;

$R_{29}$ is $C_1$–$C_{18}$alkyl;

provided at least one G is an $OR_{25}$ group.

4. A process according to claim 2 wherein $R_{37}$, $R_{38}$, $R_{39}$ and $R_{40}$ are, independently of one another, hydrogen, OH, $C_1$–$C_{20}$alkyl, $C_1$–$C_{20}$alkoxy, Cl, Br, F or COOH.

5. A process according to claim 2 wherein the (hetero) aromatic compounds are selected from the group consisting of resorcinol, hydroquinone, naphthol, catechol, phloroglucinol, dihydroxybenzoic acid, pyrogallol, naphthoquinone and dihydroxy-2-napthoic acid.

6. A composition comprising:

a) a quinacridone represented by formulae B

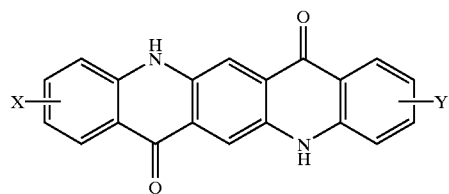

B in which X and Y are independently 1 or 2 substituents selected from the group consisting of H, F, Cl, $C_1$–$C_4$alkyl and $C_1$–$C_4$alkoxy, b) an effective amount of a (hetero)aromatic hydroxyl-containing compound of formula I according to claim 1.

7. A composition comprising a high molecular weight organic material and an effective pigmenting amount of a pigment prepared in accordance with claim 1.

8. A composition comprising a high molecular weight organic material and an effective pigmenting amount of a composition according to clam 6.

9. A process for coloring a high molecular weight organic material, which comprises incorporating an effective pigmenting amount of a pigment prepared according to claim 1 into a high molecular weight organic material.

10. A process for coloring a high molecular weight organic material, which comprises incorporating an effective pigmenting amount of a composition according to claim 6 into a high molecular weight organic material.

11. A composition comprising:

a) a quinacridone precursor represented by formulae A

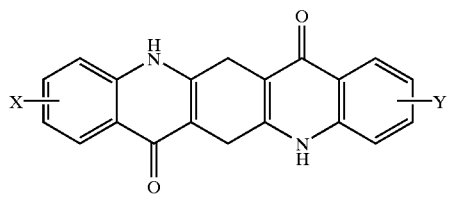

A in which X and Y, independently of one another, are hydrogen, halogen, $C_1$–$C_4$ alkyl or $C_1$–$C_4$ alkoxy, and b) an effective amount of a (hetero)aromatic hydroxyl or keto group containing compound of formula I according to claim 1 or of formulae II–XII according to claim 2.

* * * * *